US008697203B2

(12) United States Patent
Koenig

(10) Patent No.: US 8,697,203 B2
(45) Date of Patent: Apr. 15, 2014

(54) PAPER SIZING COMPOSITION WITH SALT OF CALCIUM (II) AND ORGANIC ACID, PRODUCTS MADE THEREBY, METHOD OF USING, AND METHOD OF MAKING

(75) Inventor: Michael F. Koenig, Paducah, KY (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/295,168

(22) Filed: Nov. 14, 2011

(65) Prior Publication Data

US 2012/0121872 A1 May 17, 2012

Related U.S. Application Data

(60) Provisional application No. 61/414,017, filed on Nov. 16, 2010.

(51) Int. Cl.
| | | |
|---|---|---|
| *B41M 5/00* | (2006.01) | |
| *B41M 5/52* | (2006.01) | |
| *B41M 7/00* | (2006.01) | |
| *D21H 21/16* | (2006.01) | |
| *D21H 17/28* | (2006.01) | |
| *C09J 103/00* | (2006.01) | |

(52) U.S. Cl.
CPC .............. *B41M 5/5218* (2013.01); *B41M 5/52* (2013.01); *B41M 5/5245* (2013.01); *B41M 7/00* (2013.01); *D21H 21/16* (2013.01); *D21H 17/28* (2013.01); *C09J 103/00* (2013.01)
USPC ................... 428/32.21; 428/32.3; 428/537.5; 162/135; 427/288; 106/206.1

(58) Field of Classification Search
CPC .... B41M 5/5218; B41M 5/52; B41M 5/5245; B41M 7/00; D21H 21/16; D21H 21/28; C09J 103/00
USPC .................. 428/32.21, 32.3, 537.5; 162/135; 427/288; 106/206.1
See application file for complete search history.

(56) References Cited

U.S. PATENT DOCUMENTS

| | | | |
|---|---|---|---|
| 3,600,385 A | 8/1971 | Loffelman |
| 3,719,514 A | 3/1973 | Taylor |
| 3,956,283 A | 5/1976 | Fleck |
| 3,966,654 A | 6/1976 | Aldrich |
| 4,022,965 A | 5/1977 | Goheen et al. |
| 4,075,136 A | 2/1978 | Schaper |
| 4,166,894 A | 9/1979 | Schaper |
| 4,174,417 A | 11/1979 | Rydell |
| 4,251,824 A | 2/1981 | Hara et al. |
| 4,263,182 A | 4/1981 | Aldrich |
| 4,381,185 A | 4/1983 | Swanson et al. |
| 4,410,899 A | 10/1983 | Haruta et al. |
| 4,412,224 A | 10/1983 | Sugitani |
| 4,431,481 A | 2/1984 | Drach et al. |
| 4,496,427 A | 1/1985 | Davison |
| 4,532,530 A | 7/1985 | Hawkings |
| 4,554,181 A | 11/1985 | Cousin et al. |
| 4,601,777 A | 7/1986 | Hawkins et al. |
| 4,721,655 A | 1/1988 | Trzasko |
| 4,740,420 A | 4/1988 | Akutsu et al. |
| 4,986,882 A | 1/1991 | Mackey et al. |
| 5,049,235 A | 9/1991 | Barcus et al. |
| 5,160,789 A | 11/1992 | Barcus et al. |
| 5,209,953 A | 5/1993 | Grupe et al. |
| 5,266,250 A | 11/1993 | Kroyer |
| 5,360,420 A | 11/1994 | Cook et al. |
| 5,429,860 A | 7/1995 | Held et al. |
| 5,443,899 A | 8/1995 | Barcus et al. |
| 5,531,728 A | 7/1996 | Lash |
| 5,620,793 A | 4/1997 | Suzuki et al. |
| 5,662,773 A | 9/1997 | Frederick et al. |
| 5,667,637 A | 9/1997 | Jewell et al. |
| 5,698,074 A | 12/1997 | Barcus et al. |
| 5,698,688 A | 12/1997 | Smith et al. |
| H1704 H | 1/1998 | Wallajapet et al. |
| 5,731,080 A | 3/1998 | Cousin et al. |
| 6,123,760 A | 9/2000 | Varnell |
| 6,146,494 A | 11/2000 | Seger et al. |
| 6,162,328 A | 12/2000 | Cenisio et al. |
| 6,207,258 B1 | 3/2001 | Varnell |
| 6,361,651 B1 | 3/2002 | Sun |
| 6,471,824 B1 | 10/2002 | Jewell |
| 6,506,282 B2 | 1/2003 | Hu et al. |
| 6,550,903 B2 | 4/2003 | Katsuragi et al. |

(Continued)

FOREIGN PATENT DOCUMENTS

| | | |
|---|---|---|
| EP | 0652324 | 5/1995 |
| EP | 0747235 | 12/1996 |

(Continued)

OTHER PUBLICATIONS

Automataic Color recognition System for Stockigt Sizing Test II, Journal of Korea TAPPI, 37 1, :73-81, 2005.
C. E. Farley; R. B. Wasser. The Sizing of Paper. TAPPI Press, 1989, 51-62.
Paper and board—Determination of sizing—Stoeckigt method, JIS p. 8122: 2004, rev. Mar. 20, 2004, published by Japanese Standards Association.
Chemistry and Application of Rosin Size, E. Strazdins, pp. 1-31.
Use of T530 HST on calcium carbonate-containing papers, Stever R. Boone, 1996, Tappi Journal, pp. 122-124.
Tracing Tecnique in Geohydrology by Werner Kass and Horst Behrens, published by Taylor and Francis, 1998, pp. 48-55.

(Continued)

*Primary Examiner* — Betelhem Shewareged
(74) *Attorney, Agent, or Firm* — Thomas W. Barnes, III; John K. Pike

(57) ABSTRACT

A paper sizing composition is provided, which comprises a water-soluble salt of Ca(II) and at least one organic acid; and starch. Methods of making and using the composition, and methods of making and using the recording sheets which include the composition, are disclosed.

33 Claims, 18 Drawing Sheets

(56) References Cited

U.S. PATENT DOCUMENTS

| | | | |
|---|---|---|---|
| 6,579,414 B2 | 6/2003 | Jewell | |
| 6,579,415 B2 | 6/2003 | Jewell | |
| 6,582,557 B2 | 6/2003 | Jewell | |
| 6,592,712 B2 | 7/2003 | Koukoulas et al. | |
| 6,592,717 B2 | 7/2003 | Jewell | |
| 6,827,434 B1 | 12/2004 | Katsuragi et al. | |
| 6,833,008 B2 | 12/2004 | Nitzan et al. | |
| 6,841,205 B1 | 1/2005 | Sismondi et al. | |
| 6,880,928 B2 | 4/2005 | Hosoi et al. | |
| 7,232,503 B2 | 6/2007 | Nurminen et al. | |
| 7,297,203 B2 | 11/2007 | Takada et al. | |
| 7,332,537 B2 | 2/2008 | Bredt et al. | |
| 7,582,188 B2 | 9/2009 | Stoffel et al. | |
| 8,012,551 B2 | 9/2011 | Song et al. | |
| 8,123,907 B2 | 2/2012 | Stoffel et al. | |
| 2002/0164464 A1 | 11/2002 | Monie | |
| 2003/0227531 A1 | 12/2003 | Hosoi | |
| 2004/0038056 A1* | 2/2004 | Song et al. | 428/500 |
| 2004/0241350 A1* | 12/2004 | Koga et al. | 428/32.21 |
| 2005/0107254 A1 | 5/2005 | Ogino et al. | |
| 2005/0124755 A1 | 6/2005 | Mitchell | |
| 2006/0051528 A1 | 3/2006 | Ogino | |
| 2006/0100311 A1 | 5/2006 | Tokuda et al. | |
| 2006/0254738 A1 | 11/2006 | Anderson | |
| 2007/0054068 A1 | 3/2007 | Kimpimaki et al. | |
| 2007/0062653 A1 | 3/2007 | Duggirala et al. | |
| 2007/0087138 A1 | 4/2007 | Koenig et al. | |
| 2007/0100024 A1 | 5/2007 | Gu et al. | |
| 2007/0134451 A1 | 6/2007 | Hakamada et al. | |
| 2007/0171267 A1 | 7/2007 | Tojo et al. | |
| 2007/0202279 A1 | 8/2007 | Schultz et al. | |
| 2008/0035292 A1 | 2/2008 | Singh et al. | |
| 2008/0098931 A1 | 5/2008 | Skaggs et al. | |
| 2009/0274855 A1 | 11/2009 | Koenig et al. | |
| 2009/0295892 A1 | 12/2009 | Akiyama | |
| 2009/0317549 A1* | 12/2009 | Tan et al. | 427/288 |
| 2009/0320708 A1 | 12/2009 | Jackson et al. | |
| 2010/0129553 A1 | 5/2010 | Jackson et al. | |
| 2011/0104406 A1* | 5/2011 | Zhou et al. | 428/32.1 |
| 2011/0151148 A1 | 6/2011 | Koenig et al. | |
| 2011/0151149 A1 | 6/2011 | Koenig | |
| 2011/0240241 A1 | 10/2011 | Koenig et al. | |
| 2011/0240242 A1 | 10/2011 | Koenig et al. | |
| 2011/0274856 A1 | 11/2011 | Koenig et al. | |
| 2012/0019587 A1 | 1/2012 | Koenig | |
| 2012/0121872 A1 | 5/2012 | Koenig | |

FOREIGN PATENT DOCUMENTS

| | | | |
|---|---|---|---|
| EP | 1036666 | 9/2000 | |
| EP | 1079356 | 2/2001 | |
| EP | 1122085 | 8/2001 | |
| EP | 2002274012 | 9/2002 | |
| EP | 1355004 | 10/2003 | |
| EP | 2004255593 | 6/2004 | |
| EP | 1566281 | 8/2005 | |
| EP | 1571149 | 9/2005 | |
| EP | 2006168017 | 6/2006 | |
| EP | 1712677 | 10/2006 | |
| EP | 1743976 | 1/2007 | |
| EP | 1775141 | 4/2007 | |
| EP | 1947240 | 7/2008 | |
| JP | 2002274012 | 9/2002 | |
| JP | 2004255593 | 6/2004 | |
| JP | 2006168017 | 6/2006 | |
| WO | 9609345 | 3/1996 | |
| WO | 99/06219 | 2/1999 | |
| WO | 9916973 | 4/1999 | |
| WO | 03044275 | 5/2003 | |
| WO | 2005003240 | 1/2005 | |
| WO | 2005115763 | 12/2005 | |
| WO | 2006049545 | 5/2006 | |
| WO | 2006110751 | 10/2006 | |
| WO | 2006116878 | 11/2006 | |
| WO | 2007050300 | 5/2007 | |
| WO | 2007053681 | 5/2007 | |
| WO | 2007141271 | 12/2007 | |
| WO | 2008055858 | 5/2008 | |
| WO | 2009110910 | 9/2009 | |
| WO | 2009124075 | 10/2009 | |
| WO | 2009145790 | 12/2009 | |
| WO | 2009146416 | 12/2009 | |
| WO | WO 2009/145790 A1 * | 12/2009 | B41M 5/00 |

OTHER PUBLICATIONS

Sythetic Detergents in the Soap Industry Lime Soap Dispersion Test, H.C. Borghetty et al., J. Am. Oil, Chem. Soc., 27:88-90, 1950.

Lipids in Cereal Staraches: A Review; William R. Morrison; Jounal of Cereal Science Aug. 1988, pp. 1-15.

High Solids Modified Calcium Carbonates A Concept for Inkjet Papers, Varney and Kukkamo, May 2010.

Pigment Coating Techniques, Chapter 24, p. 415-417, Jukka Linnonmaa and Michael Trefz.

Smook, Handbook for Pulp and Paper Technologist, 2nd edition, pp. 283-298—1992.

BeMiller et al., Starch, Ullmanns Encyclopedia of Industrial Chemistry, vol. 34, pp. 113-117. online, John Wiley and Sons, Inc. 2011 retrieved May 16, 2012 Retrieved from Internet: http,onlinelibrary.wiley.com/doi, 210.100-14356007.a25_001.pub4 full.

Quantitative Determination of Alkyl Ketene dimer AKD retention in Paper made on a Pilot Paper Machine, p. 253-260, (2002).

* cited by examiner

Figure 2

| Printer | Condition | Test | Value |
|---|---|---|---|
| Epson CX6600 | Starch | Black Density | 1.18 |
| Kodak 5300 | Starch | Black Density | 1.31 |
| Canon ip 4200 | Starch | Black Density | 1.28 |
| HP 6122 | Starch | Black Density | 1.10 |
| HP B9180 | Starch | Black Density | 1.12 |
| Dell 966 | Starch | Black Density | 1.44 |
| Epson CX6600 | CaCl2 | Black Density | 1.39 |
| Kodak 5300 | CaCl2 | Black Density | 1.53 |
| Canon ip 4200 | CaCl2 | Black Density | 1.39 |
| HP 6122 | CaCl2 | Black Density | 1.56 |
| HP B9180 | CaCl2 | Black Density | 1.30 |
| Dell 966 | CaCl2 | Black Density | 1.55 |
| Epson CX6600 | CaAcetate | Black Density | 1.38 |
| Kodak 5300 | CaAcetate | Black Density | 1.53 |
| Canon ip 4200 | CaAcetate | Black Density | 1.43 |
| HP 6122 | CaAcetate | Black Density | 1.54 |
| HP B9180 | CaAcetate | Black Density | 1.31 |
| Dell 966 | CaAcetate | Black Density | 1.54 |
| Epson CX6600 | CaProprionate | Black Density | 1.39 |
| Kodak 5300 | CaProprionate | Black Density | 1.53 |
| Canon ip 4200 | CaProprionate | Black Density | 1.43 |
| HP 6122 | CaProprionate | Black Density | 1.55 |
| HP B9180 | CaProprionate | Black Density | 1.31 |
| Dell 966 | CaProprionate | Black Density | 1.53 |
| Epson CX6600 | MgSO4 | Black Density | 1.34 |
| Kodak 5300 | MgSO4 | Black Density | 1.50 |
| Canon ip 4200 | MgSO4 | Black Density | 1.36 |
| HP 6122 | MgSO4 | Black Density | 1.45 |
| HP B9180 | MgSO4 | Black Density | 1.24 |
| Dell 966 | MgSO4 | Black Density | 1.49 |

| Test | Black Density | | | | | |
|---|---|---|---|---|---|---|
| Average of Value | Condition | | | | | |
| Printer | CaAcetate | CaCl2 | CaProprionate | MgSO4 | Starch | Grand Total |
| Canon ip 4200 | 1.43 | 1.39 | 1.43 | 1.36 | 1.28 | 1.378 |
| Dell 966 | 1.54 | 1.55 | 1.53 | 1.49 | 1.44 | 1.51 |
| Epson CX6600 | 1.38 | 1.39 | 1.39 | 1.34 | 1.18 | 1.336 |
| HP 6122 | 1.54 | 1.56 | 1.55 | 1.45 | 1.1 | 1.44 |
| HP B9180 | 1.31 | 1.3 | 1.31 | 1.24 | 1.12 | 1.256 |
| Kodak 5300 | 1.53 | 1.53 | 1.53 | 1.5 | 1.31 | 1.48 |
| Grand Total | 1.455 | 1.453333333 | 1.456666667 | 1.396666667 | 1.238333333 | 1.4 |

| Printer | Condition | Test | Value |
|---|---|---|---|
| Epson CX6600 | Starch | Color Gamut | 120747 |
| Kodak 5300 | Starch | Color Gamut | 95885 |
| Canon ip 4200 | Starch | Color Gamut | 134616 |
| HP 6122 | Starch | Color Gamut | 142704 |
| HP B9180 | Starch | Color Gamut | 95444 |
| Dell 966 | Starch | Color Gamut | 127731 |
| Epson CX6600 | CaCl2 | Color Gamut | 159012.4 |
| Kodak 5300 | CaCl2 | Color Gamut | 157283.9 |
| Canon ip 4200 | CaCl2 | Color Gamut | 127101.3 |
| HP 6122 | CaCl2 | Color Gamut | 170525.0 |
| HP B9180 | CaCl2 | Color Gamut | 144738.5 |
| Dell 966 | CaCl2 | Color Gamut | 152076.0 |
| Epson CX6600 | CaAcetate | Color Gamut | 157406.5 |
| Kodak 5300 | CaAcetate | Color Gamut | 151309.6 |
| Canon ip 4200 | CaAcetate | Color Gamut | 131231.4 |
| HP 6122 | CaAcetate | Color Gamut | 174945.6 |
| HP B9180 | CaAcetate | Color Gamut | 143887.8 |
| Dell 966 | CaAcetate | Color Gamut | 152546.7 |
| Epson CX6600 | CaProprionate | Color Gamut | 159387.6 |
| Kodak 5300 | CaProprionate | Color Gamut | 150038.4 |
| Canon ip 4200 | CaProprionate | Color Gamut | 134504.6 |
| HP 6122 | CaProprionate | Color Gamut | 172597.3 |
| HP B9180 | CaProprionate | Color Gamut | 143813.3 |
| Dell 966 | CaProprionate | Color Gamut | 148521.9 |
| Epson CX6600 | MgSO4 | Color Gamut | 154230.3 |
| Kodak 5300 | MgSO4 | Color Gamut | 124402.4 |
| Canon ip 4200 | MgSO4 | Color Gamut | 136121.1 |
| HP 6122 | MgSO4 | Color Gamut | 167841.6 |
| HP B9180 | MgSO4 | Color Gamut | 122973.7 |
| Dell 966 | MgSO4 | Color Gamut | 147371.9 |

Bars L-R: CaAcetate; CaCl2; CaProprionate; MgSO4; Starch

Figure 10

| PQ on the HP Officejet Pro 8000 Printer - (No HITS - Printing 3 sheets on both sides) | | | | | | | |
|---|---|---|---|---|---|---|---|
| Normal Mode and Plain Paper | | | | | | | |
| OD & Color Gamut | | | | | | | |
| | | | OD | | | | |
| Paper | Ingredient | Side | Cyan | Yellow | Magenta | Black | Color Gamut |
| Condition 1 | Starch Only, 0#/ton CMA | Label | 0.81 | 0.68 | 0.82 | 1.50 | 340802 |
| Condition 1 | Starch Only, 0#/ton CMA | Label | 0.82 | 0.67 | 0.82 | 1.48 | 338762 |
| Condition 1 | Starch Only, 0#/ton CMA | Label | 0.81 | 0.66 | 0.82 | 1.35 | 319941 |
| Condition 1 | Starch Only, 0#/ton CMA | Avg. Label | 0.81 | 0.67 | 0.82 | 1.44 | 333168 |
| Condition 1 | Starch Only, 0#/ton CMA | Bottom | 0.81 | 0.66 | 0.82 | 1.38 | 320669 |
| Condition 1 | Starch Only, 0#/ton CMA | Bottom | 0.79 | 0.66 | 0.80 | 1.39 | 317994 |
| Condition 1 | Starch Only, 0#/ton CMA | Bottom | 0.85 | 0.68 | 0.82 | 1.41 | 340462 |
| Condition 1 | Starch Only, 0#/ton CMA | Avg. Bottom | 0.82 | 0.67 | 0.81 | 1.39 | 326375 |
| Condition 2 | Starch + 10#/ton CMA | Label | 1.01 | 0.75 | 0.93 | 1.45 | 435591 |
| Condition 2 | Starch + 10#/ton CMA | Label | 0.99 | 0.75 | 0.92 | 1.46 | 428181 |
| Condition 2 | Starch + 10#/ton CMA | Label | 0.99 | 0.75 | 0.93 | 1.47 | 434208 |
| Condition 2 | Starch + 10#/ton CMA | Avg. Label | 1.00 | 0.75 | 0.93 | 1.46 | 432660 |
| Condition 2 | Starch + 10#/ton CMA | Bottom | 0.98 | 0.73 | 0.91 | 1.46 | 431580 |
| Condition 2 | Starch + 10#/ton CMA | Bottom | 0.97 | 0.75 | 0.90 | 1.42 | 430149 |
| Condition 2 | Starch + 10#/ton CMA | Bottom | 0.97 | 0.73 | 0.91 | 1.46 | 421136 |
| Condition 2 | Starch + 10#/ton CMA | Avg. Bottom | 0.97 | 0.74 | 0.91 | 1.45 | 427622 |
| Condition 3 | Starch + 15#/ton CMA | Label | 1.06 | 0.77 | 0.95 | 1.51 | 482893 |
| Condition 3 | Starch + 15#/ton CMA | Label | 1.03 | 0.77 | 0.98 | 1.45 | 470720 |
| Condition 3 | Starch + 15#/ton CMA | Label | 1.05 | 0.76 | 0.95 | 1.48 | 470487 |
| Condition 3 | Starch + 15#/ton CMA | Avg. Label | 1.05 | 0.77 | 0.96 | 1.48 | 474700 |
| Condition 3 | Starch + 15#/ton CMA | Bottom | 1.03 | 0.76 | 0.96 | 1.50 | 475008 |
| Condition 3 | Starch + 15#/ton CMA | Bottom | 1.04 | 0.75 | 0.95 | 1.47 | 466792 |
| Condition 3 | Starch + 15#/ton CMA | Bottom | 1.03 | 0.76 | 0.96 | 1.47 | 462055 |
| Condition 3 | Starch + 15#/ton CMA | Avg. Bottom | 1.03 | 0.76 | 0.96 | 1.48 | 467952 |
| Condition 4 | Starch + 20#/ton CMA | Label | 1.07 | 0.80 | 0.99 | 1.50 | 505862 |
| Condition 4 | Starch + 20#/ton CMA | Label | 1.07 | 0.78 | 0.99 | 1.47 | 482773 |
| Condition 4 | Starch + 20#/ton CMA | Label | 1.07 | 0.78 | 0.98 | 1.48 | 490505 |
| Condition 4 | Starch + 20#/ton CMA | Avg. Label | 1.07 | 0.79 | 0.99 | 1.48 | 493047 |
| Condition 4 | Starch + 20#/ton CMA | Bottom | 1.04 | 0.78 | 0.97 | 1.46 | 482755 |
| Condition 4 | Starch + 20#/ton CMA | Bottom | 1.04 | 0.77 | 0.96 | 1.48 | 480930 |
| Condition 4 | Starch + 20#/ton CMA | Bottom | 1.04 | 0.77 | 0.96 | 1.47 | 471037 |
| Condition 4 | Starch + 20#/ton CMA | Avg. Bottom | 1.04 | 0.77 | 0.96 | 1.47 | 478240 |

Figure 11

| SUMMARY (Average) | | | | | | | |
|---|---|---|---|---|---|---|---|
| | | | OD | | | | |
| Paper | Ingredient | Side | Cyan | Yellow | Magenta | Black | Color Gamut |
| Condition 1 | Starch Only, 0#/ton CMA | Label | 0.81 | 0.67 | 0.82 | 1.44 | 333168 |
| Condition 1 | Starch Only, 0#/ton CMA | Bottom | 0.82 | 0.67 | 0.81 | 1.39 | 326375 |
| Condition 2 | Starch + 10#/ton CMA | Label | 1.00 | 0.75 | 0.93 | 1.46 | 432660 |
| Condition 2 | Starch + 10#/ton CMA | Bottom | 0.97 | 0.74 | 0.91 | 1.45 | 427622 |
| Condition 3 | Starch + 15#/ton CMA | Label | 1.05 | 0.77 | 0.96 | 1.48 | 474700 |
| Condition 3 | Starch + 15#/ton CMA | Bottom | 1.03 | 0.76 | 0.96 | 1.48 | 467952 |
| Condition 4 | Starch + 20#/ton CMA | Label | 1.07 | 0.79 | 0.99 | 1.48 | 493047 |
| Condition 4 | Starch + 20#/ton CMA | Bottom | 1.04 | 0.77 | 0.96 | 1.47 | 478240 |

Figure 17

| Drawdown with metal rod and Ink A | | | | | | |
|---|---|---|---|---|---|---|
| Black OD | | | | | | |
| | | | | | | |
| | | | | Black OD | | |
| Paper | Ingredient | Side | M1 | M2 | M3 | Avg. |
| Condition 1 | Starch Only, 0#/ton CMA | Label | 0.87 | 0.89 | 0.89 | 0.88 |
| Condition 1 | Starch Only, 0#/ton CMA | Label | 0.87 | 0.87 | 0.88 | 0.87 |
| Condition 1 | Starch Only, 0#/ton CMA | Label | 0.89 | 0.88 | 0.88 | 0.88 |
| Condition 1 | Starch Only, 0#/ton CMA | Label | Avg of 3 sheets | | | 0.88 |
| Condition 1 | Starch Only, 0#/ton CMA | Bottom | 0.89 | 0.91 | 0.91 | 0.90 |
| Condition 1 | Starch Only, 0#/ton CMA | Bottom | 0.89 | 0.88 | 0.90 | 0.89 |
| Condition 1 | Starch Only, 0#/ton CMA | Bottom | 0.89 | 0.90 | 0.89 | 0.89 |
| Condition 1 | Starch Only, 0#/ton CMA | Bottom | Avg of 3 sheets | | | 0.90 |
| Condition 2 | Starch + 10#/ton CMA | Label | 1.07 | 1.09 | 1.10 | 1.09 |
| Condition 2 | Starch + 10#/ton CMA | Label | 1.08 | 1.08 | 1.09 | 1.08 |
| Condition 2 | Starch + 10#/ton CMA | Label | 1.07 | 1.12 | 1.12 | 1.10 |
| Condition 2 | Starch + 10#/ton CMA | Label | Avg of 3 sheets | | | 1.09 |
| Condition 2 | Starch + 10#/ton CMA | Bottom | 1.18 | 1.11 | 1.11 | 1.13 |
| Condition 2 | Starch + 10#/ton CMA | Bottom | 1.12 | 1.14 | 1.14 | 1.13 |
| Condition 2 | Starch + 10#/ton CMA | Bottom | 1.12 | 1.11 | 1.09 | 1.11 |
| Condition 2 | Starch + 10#/ton CMA | Bottom | Avg of 3 sheets | | | 1.12 |
| Condition 3 | Starch + 15#/ton CMA | Label | 1.23 | 1.26 | 1.28 | 1.26 |
| Condition 3 | Starch + 15#/ton CMA | Label | 1.33 | 1.29 | 1.30 | 1.31 |
| Condition 3 | Starch + 15#/ton CMA | Label | 1.24 | 1.25 | 1.24 | 1.24 |
| Condition 3 | Starch + 15#/ton CMA | Label | Avg of 3 sheets | | | 1.27 |
| Condition 3 | Starch + 15#/ton CMA | Bottom | 1.21 | 1.22 | 1.26 | 1.23 |
| Condition 3 | Starch + 15#/ton CMA | Bottom | 1.17 | 1.25 | 1.24 | 1.22 |
| Condition 3 | Starch + 15#/ton CMA | Bottom | 1.22 | 1.18 | 1.22 | 1.21 |
| Condition 3 | Starch + 15#/ton CMA | Bottom | Avg of 3 sheets | | | 1.22 |
| Condition 4 | Starch + 20#/ton CMA | Label | 1.36 | 1.36 | 1.35 | 1.36 |
| Condition 4 | Starch + 20#/ton CMA | Label | 1.33 | 1.36 | 1.34 | 1.34 |
| Condition 4 | Starch + 20#/ton CMA | Label | 1.34 | 1.36 | 1.36 | 1.35 |
| Condition 4 | Starch + 20#/ton CMA | Label | Avg of 3 sheets | | | 1.35 |
| Condition 4 | Starch + 20#/ton CMA | Bottom | 1.36 | 1.34 | 1.34 | 1.35 |
| Condition 4 | Starch + 20#/ton CMA | Bottom | 1.36 | 1.35 | 1.30 | 1.34 |
| Condition 4 | Starch + 20#/ton CMA | Bottom | 1.35 | 1.39 | 1.34 | 1.36 |
| Condition 4 | Starch + 20#/ton CMA | Bottom | Avg of 3 sheets | | | 1.35 |

PAPER SIZING COMPOSITION WITH SALT OF CALCIUM (II) AND ORGANIC ACID, PRODUCTS MADE THEREBY, METHOD OF USING, AND METHOD OF MAKING

BACKGROUND

Field of the Invention

The invention relates to compositions and methods of making same for use in papermaking. The invention also relates to methods of making and using paper products that include the composition.

BRIEF DESCRIPTION OF THE DRAWINGS

Various embodiments are described in association with the accompanying drawings, wherein:

FIG. 2 shows black density data obtained from printed recording sheets using several exemplary and comparative compositions in tabular form.

FIG. 3 shows black density data obtained from printed recording sheets using several exemplary and comparative compositions in columnar form.

FIG. 4 shows color gamut data obtained from printed recording sheets using exemplary and comparative compositions.

FIG. 10 shows OD and color gamut data obtained using an HP Officejet Pro 8000 printer with papers sized with various exemplary and comparative compositions.

FIG. 11 shows a summary of OD for papers sized with various exemplary and comparative compositions.

FIG. 17 shows black OD using drawdown with metal rod and ink and papers sized with various exemplary and comparative compositions.

DETAILED DESCRIPTION OF THE SEVERAL EMBODIMENTS

Figure 1:
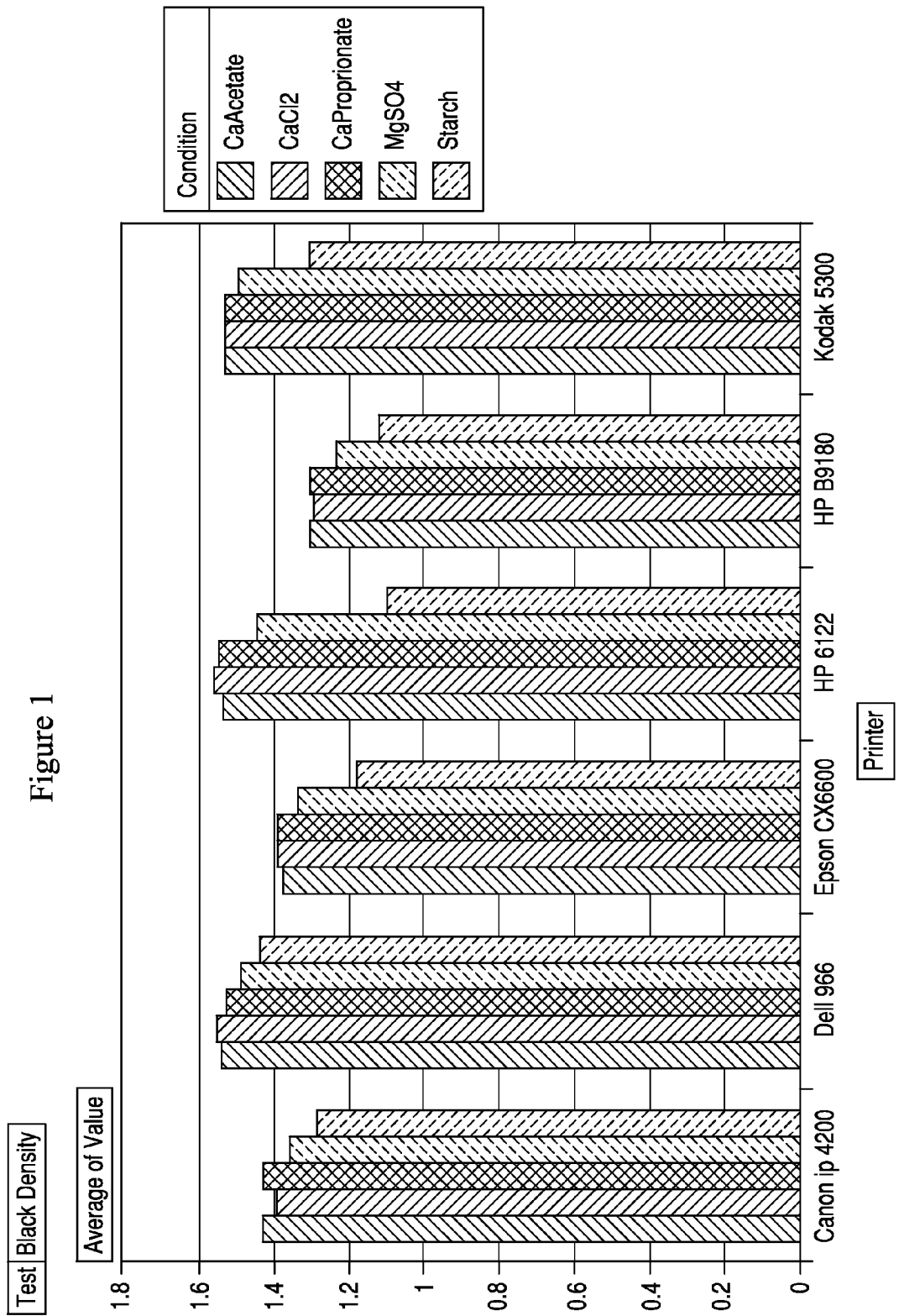
FIG. 1 graphically shows the average values of black density obtained from printed recording sheets using several exemplary and comparative compositions.

Calcium chloride, $CaCl_2$, is currently used to enhance inkjet print density and dry time. The present inventors have found that calcium chloride undesirably causes corrosion problems in the papermaking machine, quenches optical brightening agents (OBAs), and is associated with low pH, with the result that calcium chloride often is not compatible with common papermaking chemicals. The present inventors have now found that these and other problems may be overcome with the several embodiments described herein.

One embodiment of the present invention desirably achieves enhanced inkjet print density and dry time. Another embodiment desirably reduces corrosion on the papermaking machine. Another embodiment desirably reduces quenching of optical brightening agents (OBAs) in papermaking. Another embodiment desirably reduces the problems associated with low pH in papermaking. Another embodiment desirably reduces the problems of compatibility with common papermaking chemicals. Another embodiment desirably improves optical properties with lower amounts of optical brightening agents. Another embodiment desirably achieves improved ink and printing properties. Another embodiment desirably achieves improved optical properties and improved ink and printing properties. Another embodiment desirably achieves improved paper machine runnability. Another embodiment desirably achieves improved ink fastness.

One embodiment relates to a paper sizing composition, comprising:

a water-soluble salt of Ca(II) and at least one organic acid; and starch.

Another embodiment relates to a method for making a sizing composition, comprising contacting:

a water-soluble salt of Ca(II) and at least one organic acid; and starch;

to produce a sizing composition.

Another embodiment relates to a method for making a recording sheet, comprising:

contacting:

a paper substrate comprising a plurality of cellulosic fibers; and a composition, comprising:

a water-soluble salt of Ca(II) and at least one organic acid; and starch;

to produce a recording sheet.

Another embodiment relates to a method, comprising forming an image with a printing apparatus on a surface of a recording sheet, said recording sheet comprising:

a paper substrate comprising:

a plurality of cellulosic fibers; and a composition, comprising:

a water-soluble salt of Ca(II) and at least one organic acid; and starch.

Another embodiment relates to a recording sheet, comprising:

a paper substrate, comprising:
    a plurality of cellulosic fibers; and
    a composition, comprising:
        a water-soluble salt of Ca(II) and at least one organic acid; and starch.

The organic acid includes any compound having a carboxylic acid group which can disassociate to form a carboxylate group and form a water soluble salt with Ca(II). In one embodiment, the organic acid has the formula, RCOOH, wherein R is any hydrocarbon. The number of carbons in the R group is not particularly limited so long as the resulting salt formed with the Ca(II) cation is water soluble. In one embodiment, the R group may have any number of carbon atoms ranging from 1 to 30, which range includes all values and subranges therebetween, including 1, 2, 3, 4, 5, 6, 7, 8, 9, 10, 11, 12, 13, 14, 15, 16, 17, 18, 19, 20, 22, 23, 24, 25, 26, 27, 28, 29, and 30 carbons. The hydrocarbon may be branched or unbranched, substituted or unsubstituted, saturated or unsaturated, cyclic, heterocyclic, aromatic, or heteroaromatic. One or more of the carbons in the R group may be optionally substituted with one or more heteroatoms such as N, S, O, P, and the like. The organic acid may have more than one carboxylic acid group. The organic acid may be zwitterionic or amphoteric, for example an aminocarboxylic acid containing a single C—N bond adjacent (vicinal) to the C—$CO_2$H bond, such as EDTA $((HO_2CCH_2)_2NCH_2CH_2N(CH_2CO_2H)_2)$, DTPA $((HO_2CCH_2)_2NCH_2CH_2N(CH_2CO_2H)CH_2CH_2N(CH_2CO_2H)_2)$, and the like. In one embodiment, the R group is a saturated or monounsaturated or polyunsaturuated C1-C5 alkyl, C1-C5 hydroxyalkyl or phenyl. Non-limiting examples of the water soluble salt include calcium acetate, calcium formate, calcium proprionate, calcium lactate, calcium stearate, calcium tartrate, calcium gluconate, calcium citrate, calcium lactate gluconate, calcium 2-ethylbutanoate, calcium EDTA, calcium DTPA, calcium magnesium acetate (sometimes referred to as "CMA"); and the like. The organic acid may have more than one carboxylic acid group, for example, and may be monovalent, divalent, trivalent, or tetravalent, or of higher valency. The water soluble salt of Ca(II) and the organic acid may be a complex salt in the sense that two different monovalent organic acids form the salt with a single Ca(II) ion. In another embodiment, the water soluble salt of Ca(II) and the organic acid is made with two identical organic acids. In another embodiment, the water soluble salt of Ca(II) and the organic acid may be a complex salt in the sense that more than one Ca(II) cation is present in the salt to counterbalance one or more multivalent organic acids. In another embodiment, the water soluble salt of Ca(II) and the organic acid may be a complex salt in the sense that more than one cation is present in the salt to counterbalance one or more multivalent organic acids. Mixtures of different water soluble salts of Ca(II) and organic acid are possible.

The amount of water soluble salt of Ca(II) and organic acid present in the sizing composition is not particularly limited. In one embodiment, it may range from 0.1 to 50% by weight based on the weight of the sizing composition. This range includes all values and subranges therebetween, including 0.1, 0.25, 0.5, 0.75, 1, 2.5, 5, 7.5, 10, 15, 20, 25, 30, 35, 40, 45, and 50% by weight of the sizing composition.

In one embodiment, the amount of water soluble Ca(II) salt of the organic acid ranges from about 2 to about 100 lbs Ca(II) salt/ton of paper. This range includes all values and subranges therebetween, including about 2, 3, 4, 5, 6, 7, 8, 9, 10, 12, 14, 16, 18, 20, 25, 30, 40, 50, 60, 70, 80, 90, and 100 lbs Ca(II) salt of organic acid/ton of paper.

In one embodiment, the amount of calcium (II) ranges from about 1 to about 30 lbs calcium (II)/ton of paper. This range includes all values and subranges therebetween, including about 1, 2, 3, 4, 5, 6, 7, 8, 9, 10, 12, 14, 16, 18, 20, 25, and 30 lbs calcium (II)/ton of paper for 75 gsm basis weight paper.

In one embodiment, the water solubility of the calcium (II) salt may suitably range from slightly or moderately soluble to soluble, measured as a saturated aqueous solution of the salt at 25° C. In one embodiment, the water solubility at 25° C. may range from 0.002 grams salt/100 cc $H_2O$ and greater. This range includes all values and subranges therebetween, including about 0.002, 0.003, 0.004, 0.005, 0.007, 0.009, 0.01, 0.02, 0.03, 0.05, 0.07, 0.09, 0.1, 0.5, 1, 1.5, 2, 5, 7, 10, 15, 20, 25 grams salt/100 cc $H_2O$ and higher. In one embodiment, the water solubility of the salt ranges from 0.002 to 100 grams salt/100 cc $H_2O$.

The amount of water soluble Ca(II) salt in contact with the substrate can vary widely. In one embodiment, this amount is at least 0.02 $g/m^2$, although lower or higher amounts can be used. In one embodiment, the amount of water soluble Ca(II) salt is from about 0.02 $g/m^2$ to about 4 $g/m^2$, which ranges includes all values and subranges therebetween, including 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.25, 2.5, 2.75, 3, 3.25, 3.5, 3.75, and 4 $g/m^2$ or any combination thereof.

The composition may or may not contain $CaCl_2$. In one embodiment, $CaCl_2$ is not present in the composition.

In one embodiment, the calcium (II) salt is soluble in the amount used in the sizing formulation. In one embodiment, it is soluble at about pH 7 to about pH 9. The sizing medium may be an aqueous solution, emulsion, dispersion, or a latex or colloidal composition, and the term "emulsion" is used herein, as is customary in the art, to mean either a dispersion of the liquid-in-liquid type or of the solid-in-liquid type, as well as latex or colloidal composition.

The starch is not particularly limited. It may be modified or unmodified. Non-limiting examples of starch may be found in the "Handbook for Pulp and Paper Technologists" by G. A. Smook (1992), Angus Wilde Publications, the contents of which are hereby incorporated by reference. Non-limiting examples of modified starches include, for example, oxidized, cationic, ethylated, hydroethoxylated, etc. The starch may come from any source, such as potato or corn. In one embodiment, the starch source is corn. Mixtures of starches are possible.

Other non-limiting examples of starches include naturally occurring carbohydrates synthesized in corn, tapioca, potato, and other plants by polymerization of dextrose units. All such starches and modified forms thereof such as starch acetates, starch esters, starch ethers, starch phosphates, starch xanthates, anionic starches, cationic starches, oxidized starches, and the like which can be derived by reacting the starch with a suitable chemical or enzymatic reagent can be used. If desired, starches may be prepared by known techniques or obtained from commercial sources. Example of commercial starches include Ethylex 2035 from A. E. Staley, PG-280 from Penford Products, oxidized corn starches from ADM, Cargill, and Raisio, and enzyme converted starches such as Amyzet 150 from Amylum. Mixtures are possible.

Other modified starches may be used. Non-limiting examples of a type of modified starches include cationic modified or chemically modified starches such as ethylated starches, oxidized starches, and AP and enzyme converted Pearl starches. Chemically modified starches such as ethylated starches, oxidized starches, and AP and enzyme converted Pearl starches are possible. Mixtures are possible.

In one embodiment, the starch is not ethylated starch.

The amount of starch is not particularly limited. In one embodiment, In one embodiment, it may range from 0.1 to 75% by weight based on the weight of the sizing composition. This range includes all values and subranges therebetween, including 0.1, 0.25, 0.5, 0.75, 1, 2.5, 5, 7.5, 10, 15, 20, 25, 30, 35, 40, 45, 50, 55, 60, 65, 70, and 75% by weight of the sizing composition.

In one embodiment, the amount of starch in the sizing composition may range from 5 to 300 lbs/ton. This range includes all values and subranges therebetween, including 5, 10, 15, 20, 25, 30, 35, 40, 45, 50, 75, 100, 125, 150, 175, 200, 250, and 300 lbs/ton.

In one embodiment, the sizing composition is applied in an amount such that a dry pickup of 10 to 250 lbs of starch/ton of paper at 12-50% solids for the size press formulation is obtained. The aforementioned range of starch includes all values and subranges therebetween, including 10, 20, 30, 35, 40, 45, 50, 55, 60, 65, 70, 75, 80, 85, 90, 95, 100, 105, 110, 115, 120, 125, 130, 135, 140, 145, 150, 200, and 250 lbs/ton.

In one embodiment, lbs/ton is calculated on a paper having a basis weight equal to 75 gsm. It should be readily apparent that the amounts in lbs/ton and moles/ton may vary in a known manner according to the basis weight of the paper, and the embodiments are not limited to only paper having a basis weight of 75 gsm.

In one embodiment, the % solids in the sizing composition may suitably range from at least 5-75%. This range includes all values and subranges therebetween, including 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, and 75% by weight of the sizing composition.

A recording sheet may suitably contain an effective amount of the water soluble Ca(II) salt and starch in contact with at least one surface of the substrate. As used herein, an "effective amount" is an amount which is sufficient to obtain a good dry time, water fastness, or printing property, for example black density, color gamut, and the like. In one embodiment, the dry pickup of the sizing composition may suitably range from 0.25 to 8 gsm, which range includes all values and subranges therebetween, for example, 0.25, 0.3, 0.4, 0.5, 0.6, 0.7, 0.8, 0.9, 1, 2, 3, 4, 5, 6, 7, and 8 gsm.

In one embodiment, the recording sheet comprises 30 to 150 lbs/ton of starch and 10 to 50 lbs/ton water soluble salt of Ca(II) and organic acid (3 to 15 lbs/ton of calcium).

The composition may optionally contain one or more optical brightening agents, sometimes referred to as optical brighteners or OBAs. Typically, the optical brightening agents are fluorescent dyes or pigments that absorb ultraviolet radiation and reemit it at a higher wavelengths in the visible spectrum (blue), thereby effecting a white, bright appearance to the paper sheet when added to the stock furnish. Non-limiting optical brighteners include azoles, biphenyls, coumarins, furans, stilbenes, ionic brighteners, including anionic, cationic, and anionic (neutral) compounds, such as the Eccobrite™ and Eccowhite™ compounds available from Eastern Color & Chemical Co. (Providence, R.I.); naphthalimides; pyrazenes; substituted (e.g., sulfonated) stilbenes, such as the Leucophor™ range of optical brighteners available from the Clariant Corporation (Muttenz, Switzerland), and Tinopal™ from Ciba Specialty Chemicals (Basel, Switzerland); salts of such compounds including but not limited to alkali metal salts, alkaline earth metal salts, transition metal salts, organic salts and ammonium salts of such brightening agents; and combinations of one or more of the foregoing agents. Mixtures are possible.

In one embodiment, the optical brighteners are selected from the group including disulfonated, tetrasulfonated, and hexasulfonated stilbene-based OBAs, and combinations thereof.

The amount of optical brightening agent is not particularly limited. The optical brighteners may be added in any amount ranging from 0.1 to 100 pounds per 100 pounds of sizing composition. This range includes all values and subranges therebetween, including 0.1, 0.25, 0.5, 0.75, 1, 2, 3, 4, 5, 6, 7, 8, 9, 10, 15, 20, 25, 30, 35, 40, 45, 50, 55, 60, 65, 70, 75, 80, 85, 90, 95 and 100 pounds. In another embodiment, the optical brightening agent may be added in amounts ranging from about 0.005 to about 4 weight percent based on the weight of the paper product, such as a recording sheet. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, and 4 weight percent based on the weight of the paper product.

In one embodiment, the composition contains the water soluble Ca(II) salt of an organic acid with Ca(II) as the sole cation in the water soluble Ca(II) salt of the organic acid.

So long as the composition contains the water soluble Ca(II) salt of an organic acid, the sizing composition may optionally contain one or more additional salts. For example, in addition to the water soluble Ca(II) salt of the organic acid, the sizing composition may contain none, or one or more additional salts. For example, the additional salt may include one or more additional water soluble monovalent, divalent, or tetravalent metal salts. Examples of additional monovalent water soluble metal salts include but are not limited to sodium, potassium, and the like. Examples of additional divalent water soluble metal salts include but are not limited to compounds containing divalent calcium, magnesium, barium, zinc, or any combination of these. The counter ions (anions) may be simple or complex and may vary widely. Non-limiting examples of such materials are calcium chloride, magnesium chloride, Mg EDTA, and the like, and combinations thereof.

In one embodiment, the divalent metal salt may be a mineral or organic acid salt of a divalent cationic metal ion, or a combination thereof. In one embodiment, the water soluble metal salt may include a halide, nitrate, chlorate, perchlorate, sulfate, acetate, carboxylate, hydroxide, nitrite, or the like, or combinations thereof, of calcium, magnesium, barium, zinc (II), or the like, or combinations thereof. Some examples of divalent metal salts include, without limitation, sodium acetate, calcium chloride, magnesium chloride, magnesium bromide, calcium bromide, barium chloride, calcium nitrate, magnesium nitrate, barium nitrate, calcium acetate, magnesium acetate, barium acetate, calcium magnesium acetate, magnesium propionate, barium propionate, calcium nitrite, calcium hydroxide, zinc chloride, zinc acetate, and combinations thereof. Mixtures or combinations of salts of different divalent metals, different anions, or both are possible. The relative weight of the divalent cationic metal ion in the divalent metal salt may be maximized, if desired, with respect to the anion in the salt to provide enhanced properties based on the total weight of applied salt.

The composition may optionally include one or more co-crystalline salt of an inorganic acid, organic acid, organometallic compound, or other metal complex (other than metal oxides) in which a ligand is bound to a metal ion by a chemical bond, such as a covalent bond, ionic bond, coordination covalent bond, metallic bond, aromatic bond or bent bond. In one embodiment, the co-crystalline salt is soluble or dispersible in water or other aqueous solvent. Examples of suitable metal cations include, but are not limited to, potassium, sodium, lithium, aluminum, calcium, magnesium, zinc, iron, strontium, barium, nickel, copper, scandium, gallium, indium, titanium, zirconium, tin and lead. In one embodiment, co-crystalline compounds comprising magnesium, aluminum, zirconium, calcium and zinc cations may be suitable when a colorless composition is desired. In one embodiment, the co-crystalline salt contains one or more polyvalent metal cations. Mixtures of co-crystalline salts are possible.

Non-limiting examples of multi-cation co-crystalline salts include potassium sodium tartrate, potassium sodium bromlite; potassium dihydrogen citrate; lithium potassium hydrogen citrate monohydrate; tamarugite (NaAl$(SO_4)_x \cdot 6H_2O$), barium silicon iodide ($Ba_3SiI_2$); potassium tetrachloroaluminate ($AlKCl_4$); lithium tetrachloroaluminate ($AlLiCl_4$); sodium tetrachloroaluminate ($AlNaCl_4$); cesium tetrachloroaluminate ($AlCeCl_4$); aluminum hexafluoroaluminate; postassium aluminum sulfate dodecahydrate; potassium tetrafluorobotate ($BF_4K$); lithium tetrafluorobotate; sodium tetrafluorobotate; calcium tetrafluoroborate hydrate ($B_2CaF_8$); tin tetrafluoroborate ($B_2SnF_8$); titanium chloride-aluminum chloride ($AlCi_2Ti_3$); aluminum cesium sulfate dodecahydrate ($AlCsO_8S_2 \cdot 12H_2O$); magnesium aluminum hydrotalcites, and calcium magnesium acetate; salts of alkali sulfates having the general formula $M^+{}_2SO_4 \cdot M^{3+}{}_2(SO_4)_3 \cdot 24H_2O$, wherein $M^+$ is an alkali metal (e.g., lithium, sodium, potassium, rubidium, or cesium) or ammonium ion ($NH^{4+}$), and $M^{3+}$ is a trivalent metal ion (e.g., aluminum, chromium, or iron (III)). Mixtures are possible.

Multi-anion co-crystalline salts may also be used. They include, but are not limited to, zinc chloride co-crystalline salts such as 4-phenoxydiazobenzene zinc chloride and 2,5-dimethoxy-4-tolylmercaptodiazobenzene zinc chloride; and magnesium nitrate co-crystalline salts such as triacetatohexaaquodimagnesium nitrate. Mixtures are possible.

The composition can be added to bleached pulp or paper product at any point in the paper manufacturing process. Some examples of addition points include, but are not limited to (a) to the pulp slurry in the latency chest; (b) to the pulp during or after the bleaching stage in a storage, blending or transfer chest; (c) before the final debleaching stage where the pH is alkaline; (d) to pulp after bleaching, washing and dewatering followed by cylinder or flash drying; (e) before or after the cleaners; (f) before or after the fan pump to the paper machine headbox; (g) to the paper machine white water; (h) sprayed or showered onto the moving wet web after head box forming but before wet press; (i) to the silo or save all; (j) in the press section using, for example, a size press, coater or spray bar; (k) in the drying section using, for example, a size press, coater or spray bar; (l) on the calender using a wafer box; (m) on paper in an off-machine coater or size press; and/or (n) in the curl control unit. Combinations are possible.

The precise location where the composition is added will depend on the specific equipment involved, the exact process conditions being used and the like. In some cases, one or more sizing compositions, having the same or different composition—so long as it contains the water soluble Ca(II) salt of the organic acid and starch—may be added at one or more locations for optimal effectiveness.

Application can be by any means conventionally used in papermaking processes, including by "split-feeding" whereby one or more of the water soluble salts of Ca(II) and organic acid and/or starch is/are applied at one point in the papermaking process, for example on pulp or a wet sheet (before the dryers) and the remaining portion of one or more of the water soluble salts of Ca(II) and organic acid and/or starch is/are added at a subsequent point, for example in the size press.

In one embodiment, the starch can be added to a bleached pulp or paper product before, after, or simultaneously with the water soluble Ca(II) salt. The optical brightener may also be formulated with the water soluble Ca(II) salt, starch, or both.

In one embodiment, the sizing composition may be applied in the size press.

The sizing composition may be applied to, mixed with, or contacted with a paper substrate to produce a recording sheet. The paper substrate suitably comprises a plurality of cellulosic fibers. The type of cellulosic fiber is not critical, and any such fiber known or suitable for use in paper making can be used. For example, the substrate can made from pulp fibers derived from hardwood trees, softwood trees, or a combination of hardwood and softwood trees. The fibers may be prepared for use in a papermaking furnish by one or more known or suitable digestion, refining, and/or bleaching operations such as, for example, known mechanical, thermomechanical, chemical and/or semichemical pulping and/or other well known pulping processes. The term, "hardwood pulps" as used herein may include fibrous pulp derived from the woody substance of deciduous trees (angiosperms) such as birch, oak, beech, maple, and eucalyptus. The term, "softwood pulps" as used herein may include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached pulp fiber may be utilized. Recycled pulp fibers are also suitable for use.

The paper substrate may suitably contain from 1 to 99 wt % of cellulosic fibers based upon the total weight of the substrate. In one embodiment, the paper substrate may contain from 5 to 95 wt % of cellulosic fibers based upon the total weight of the substrate. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The paper substrate may optionally contain from 1 to 100 wt % cellulosic fibers originating from softwood species based upon the total amount of cellulosic fibers in the paper substrate. In one embodiment, the paper substrate may contain 10 to 60 wt % cellulosic fibers originating from softwood species based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of cellulosic fibers in the paper substrate.

In one embodiment, the paper substrate may alternatively or overlappingly contain from 0.01 to 99 wt % fibers from softwood species, based on the total weight of the paper substrate. In another embodiment, the paper substrate may contain from 10 to 60 wt % fibers from softwood species based upon the total weight of the paper substrate. These ranges include any and all values and subranges therein. For example, the paper substrate may contain not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 99 wt % softwood based upon the total weight of the paper substrate.

All or part of the softwood fibers may optionally originate from softwood species having a Canadian Standard Freeness (CSF) of from 300 to 750. In one embodiment, the paper substrate contains fibers from a softwood species having a CSF from 400 to 550. These ranges include any and all values and subranges therebetwen, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The paper substrate may optionally contain from 1 to 100 wt % cellulosic fibers originating from hardwood species based upon the total amount of cellulosic fibers in the paper substrate. In one embodiment, the paper substrate may contain from 30 to 90 wt % cellulosic fibers originating from hardwood species, based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of cellulosic fibers in the paper substrate.

In one embodiment, the paper substrate may alternatively or overlappingly contain from 0.01 to 99 wt % fibers from hardwood species, based upon the total weight of the paper substrate. In another embodiment, the paper substrate may alternatively or overlappingly contain from 60 to 90 wt % fibers from hardwood species, based upon the total weight of the paper substrate. These ranges include any and all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 99 wt %, based upon the total weight of the paper substrate.

All or part of the hardwood fibers may optionally originate from hardwood species having a Canadian Standard Freeness of from 300 to 750. In one embodiment, the paper substrate may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The paper substrate may optionally contain less refined fibers, for example, less refined softwood fibers, less refined hardwood fibers, or both. Combinations of less refined and more refined fibers are possible. In one embodiment, the paper substrate contains fibers that are at least 2% less refined than that of fibers used in conventional paper substrates. This range includes all values and subranges therebetween, including at least 2, 5, 10, 15, and 20%. For example, if a conventional paper contains fibers, softwood and/or hardwood, having a Canadian Standard Freeness of 350, then, in one embodiment, the paper substrate may contain fibers having a CSF of 385 (i.e. refined 10% less than conventional) and still perform similar to, if not better than, the conventional paper. Examples of some reductions in refining of hardwood and/or softwood fibers include, but are not limited to: 1) from 350 to at least 385 CSF; 2) from 350 to at least 400 CSF; 3) from 400 to at least 450 CSF; and 4) from 450 to at least 500 CSF. In some embodiments, the reduction in fiber refinement may be at least 2, 3, 4, 5, 6, 7, 8, 9, 10, 11, 12, 13, 14, 15, 16, 17, 18, 19, 20, and 25% reduction in refining compared to those fibers in conventional paper substrates.

When the paper substrate contains both hardwood fibers and softwood fibers, the hardwood/softwood fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Non-limiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579,414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference. Still other examples of suitable modifications of fibers may be found in U.S. Application Nos. 60/654,712, filed Feb. 19, 2005, and Ser. No. 11/358,543, filed Feb. 21, 2006, which may include the further addition of optical brighteners (i.e. OBAs) as discussed therein, the entire contents of each of which are hereby incorporated, independently, by reference.

The paper substrate may optionally include "fines." "Fines" fibers are typically those fibers with average lengths of not more than about 100 μm. Sources of "fines" may be found in SaveAll fibers, recirculated streams, reject streams, waste fiber streams, and combinations thereof. The amount of "fines" present in the paper substrate can be modified, for example, by tailoring the rate at which streams are added to the paper making process. In one embodiment, the average lengths of the fines are not more than about 5, 10, 15, 20, 25, 30, 35, 40, 45, 50, 55, 60, 65, 70, 75, 80, 85, 90, 95, and 100 μm, including any and all ranges and subranges therein.

If used, the "fines" fibers may be present in the paper substrate together with hardwood fibers, softwood fibers, or both hardwood and softwood fibers.

The paper substrate may optionally contain from 0.01 to 100 wt % fines, based on the total weight of the paper substrate. In one embodiment, the paper substrate may contain from 0.01 to 50 wt % fines, based upon the total weight of the substrate. These ranges include all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the paper substrate.

In one embodiment, the paper substrate may alternatively or overlappingly contain from 0.01 to 100 wt % fines, based upon the total weight of the fibers in the paper substrate. This range includes all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the fibers in by the paper substrate.

The composition and/or recording sheet may optionally contain one or more additional sizing agents. The additional sizing agent is not particularly limited, and any conventional papermaking sizing agent may be used. The additional sizing agent may be nonreactive, reactive, or a combination of non-reactive and reactive. The additional sizing agent may, optionally and if desired, impart a moisture or water-resistance in varying degrees to the paper substrate. Non-limiting examples of additional sizing agents can be found in the "Handbook for Pulp and Paper Technologists" by G. A. Smook (1992), Angus Wilde Publications, already incorporated by reference. Non-limiting examples os additional sizing agents include alkyl ketene dimer (AKD), alkenyl ketene dimer (ALKD), alkenyl succinic anhydride (ASA), ASA/ALKD, styrene acrylic emulsion (SAE) polyvinyl alcohol (PVOH), polyvinylamine, alginate, carboxymethyl cellulose, etc.

The additional sizing agent may include nonreactive sizing agents, such as are known in the art. Examples include, without limitation, a polymer emulsion, a cationic polymer emulsion, an amphoteric polymer emulsion, polymer emulsion wherein at least one monomer is selected from the group including styrene, α-methylstyrene, acrylate with an ester substituent with 1 to 13 carbon atoms, methacrylate having an ester substituent with 1 to 13 carbon atoms, acrylonitrile, methacrylonitrile, vinyl acetate, ethylene and butadiene; and optionally including acrylic acid, methacrylic acid, maleic anhydride, esters of maleic anhydride or mixtures thereof, with an acid number less than about 80, and mixtures thereof, BASOPLAST® 335D nonreactive polymeric surface size emulsion from BASF Corporation (Mt. Olive, N.J.), FLEX-BOND® 325 emulsion of a copolymer of vinyl acetate and butyl acrylate from Air Products and Chemicals, Inc. (Trexlertown, Pa.), and PENTAPRINT® nonreactive sizing agents, and the like, and combinations thereof.

Other additional sizing agents, for example, non-reactive dispersed rosin sizing agents may be optionally used. Dispersed rosin sizing agents are well known. Non-limiting examples of rosin sizing agents are disclosed in, for example, U.S. Pat. Nos. 3,966,654 and 4,263,182, the entire contents of each of which are hereby incorporated by reference. The rosin may be any modified or unmodified, dispersible or emulsifiable rosin suitable for sizing paper, including unfortified rosin, fortified rosin and extended rosin, as well as rosin esters, and mixtures and blends thereof. The rosin in dispersed form is not particularly limited, and any of the commercially available types of rosin, such as wood rosin, gum rosin, tall oil rosin, and mixtures of any two or more, in their crude or refined state, may be used. In one embodiment, tall oil rosin and gum rosin are used. Partially hydrogenated rosins and polymerized rosins, as well as rosins that have been treated to inhibit crystallization, such as by heat treatment or reaction with formaldehyde, may also be employed.

Mixtures of Additional Sizing Agents are Possible.

The composition may be suitably used as an internal sizing, an external sizing, or both. The internal and external sizing compositions may have the same or different compositions. When used as both internal and external sizing, the sizing compositions may be present in any weight ratio and may be the same and/or different. Alternatively, the recording sheet may use different internal or external sizing compositions, wherein only one sizing contains the water soluble Ca(II) salt of the organic acid and starch, and the other sizing does not contain the water soluble Ca(II) salt of the organic acid or starch. In one embodiment, the weight ratio of surface sizing to internal sizing is from 50/50 to 100/0 or from 75/25 to 100/0 surface/internal sizing. In another embodiment, the weight ratio of internal sizing to external sizing is from 50/50 to 100/0 or from 75/25 to 100/0 internal/surface sizing These ranges include 50/50, 55/45, 60/40, 65/35, 70/30, 75/25, 80/20, 85/15, 90/10, 95/5 and 100/0, including any and all ranges and subranges therein.

In one embodiment, the sizing composition may be applied to one or both sides of a paper substrate.

The amount of water soluble metal Ca(II) salt of the organic acid and starch in and/or on the substrate is not particularly limited.

The sizing composition may also include one or more optional additives such as binders, pigments, thickeners, defoamers, surfactants, slip agents, dispersants, optical brighteners, dyes, and preservatives, which are well-known. Examples of pigments include, but are not limited to, clay, calcium carbonate, calcium sulfate hemihydrate, and calcium sulfate dehydrate, chalk, GCC, PCC, and the like. In one embodiment, the pigment is calcium carbonate, for example precipitated calcium carbonate. Examples of binders include, but are not limited to, polyvinyl alcohol, Amres (a Kymene type), Bayer Parez, polychloride emulsion, polyacrylamide, modified polyacrylamide, polyol, polyol carbonyl adduct, ethanedial/polyol condensate, polyimide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional additives include, but are not limited to silicas such as colloids and/or sols. Examples of silicas include, but are not limited to, sodium silicate and/or borosilicates. Other additives which may be used include one or more solvents such as, for example, water. Combinations of additives are possible.

It may be advantageous that a majority of the total amount of sizing composition is located at or near the outside surface or surfaces (in the case of the sizing applied to both surfaces) of the paper substrate. In one embodiment, the paper substrate contains the sizing composition such that the substrate and the sizing composition cooperate to form an I-beam structure. I-beam structures are discussed, for example, U.S. Patent Publication No. 2004/0065423, published Apr. 8, 2004, and in the US Provisional Application filed by International Paper, the entire contents of each of which are hereby incorporated independently by reference. In this regard, it is not required that the sizing composition interpenetrates with the cellulosic fibers of the substrate. However, if the sizing or coating layer and the cellulose fibers interpenetrate, it will create a paper substrate having an interpenetration layer, which is within the ambit of the present invention.

In one embodiment, the interpenetration layer of the paper substrate may define a region in which at least the sizing composition penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when the sizing composition is added to the cellulose fibers prior to a coating method and may be combined with a subsequent coating method if required. Addition points may be at the size press, for example.

In one embodiment, the cross-sectional thickness of the interpenetration layer may be minimized. Alternatively, or additionally, the concentration of the sizing composition increases as one moves (in the z-direction normal to the plane of the substrate) from the interior portion towards the surface of the paper substrate. Therefore, the amount of sizing composition present towards the top and/or bottom outer surfaces of the substrate may be greater than the amount of sizing composition present towards the inner middle of paper substrate. Alternatively, a majority percentage of the sizing composition may be located at a distance from the outside surface of the substrate that is equal to or less than 25%, more preferably 10%, of the total thickness of the substrate. This aspect may also be known as the $Q_{total}$, which is measured by known methodologies outlined, for example, in U.S. Patent Publication No. 2008/0035292, published Feb. 14, 2008, the entire contents of which are hereby incorporated by reference. If $Q_{total}$ is equal to 0.5, then the sizing composition interpenetrates and is approximately evenly distributed throughout the paper substrate. If $Q_{total}$ is greater than 0.5, then there is more sizing towards the central portion (measured by the z-direction normal to the plane of the substrate) of the paper substrate than towards the paper substrate's surface or surfaces. If $Q_{total}$ is less than 0.5, then there is less sizing towards the central portion of the paper substrate than towards the paper substrate's surface or surfaces. In light of the above, the paper substrate may have a $Q_{total}$ that is less than 0.5, or from 0 to less than 0.5. This range includes 0, 0.001, 0.002, 0.005, 0.01, 0.02, 0.05, 0.1, 0.15, 0.2, 0.25, 0.3, 0.35, 0.4, 0.45, and 0.49, including any and all ranges and subranges therein.

As noted above, the determination of Q may be suitably carried out according to the procedures in U.S. Patent Publication 2008/0035292, published Feb. 14, 2008.

The paper substrate may be pressed in a press section containing one or more nips. Any pressing means commonly known in the art of papermaking may be utilized. The nips may be, but are not limited to, single felted, double felted, roll, and extended nip in the presses.

The paper substrate and/or recording sheet may be dried in a drying section. Any drying means commonly known in the art of papermaking may be utilized. The drying section may include and contain a drying can, cylinder drying, Condebelt drying, IR, or other drying means and mechanisms known in the art. The paper substrate may be dried so as to contain any selected amount of water. In one embodiment, the substrate is dried to contain less than or equal to 10% water.

The paper substrate and/or recording sheet may be calendered by any commonly known calendaring means in the art of papermaking, for example, wet stack calendering, dry stack calendering, steel nip calendaring, hot soft calendaring or extended nip calendering, etc.

The paper substrate and/or recording sheet may be microfinished according to any process commonly known in the art of papermaking. Microfinishing typically involves frictional processes to finish surfaces of the paper substrate. The paper substrate may be microfinished with or without a calendering applied thereto consecutively and/or simultaneously.

In one embodiment, the paper substrate and/or recording sheet may be further coated by any conventional coating layer application means, including impregnation means. One method of applying the coating layer is with an in-line coating process with one or more stations. The coating stations may be any of known coating means commonly known in the art of papermaking including, for example, brush, rod, air knife, spray, curtain, blade, transfer roll, reverse roll, and/or cast coating means, as well as any combination of the same.

The recording sheet may optionally contain from 0.001 to 20 wt % of optional additives based on the total weight of the substrate, preferably from 0.01 to 10 wt %, most preferably 0.1 to 5.0 wt %, of each of at least one of the optional additives. This range includes 0.001, 0.002, 0.005, 0.006, 0.008, 0.01, 0.02, 0.03, 0.04, 0.05, 0.1, 0.2, 0.4, 0.5, 0.6, 0,7, 0.8, 0.9, 1, 2, 4, 5, 6, 8, 10, 12, 14, 15, 16, 18, and 20 wt % based on the total weight of the substrate, including any and all ranges and subranges therein.

Other conventional additives that may be present include, but are not limited to, one or more wet strength resins, internal sizes, dry strength resins, alum, fillers, pigments and dyes. The substrate may include bulking agents such as expandable microspheres, pulp fibers, and/or diamide salts. Mixtures are possible.

If desired, one or more reducing agents may be optionally added to enhance the effect of the optical brighteners. Some examples of reducing agents are discussed in U.S. Patent Application Publication 2007/0062653, incorporated herein by reference in its entirety. If utilized, one measure of an effective amount of reducing agent added to bleached pulp or paper product is that which enhances the brightness and resistance to thermal yellowing of the pulp or paper compared to pulp or paper which is not treated with the reducing agents. Methods for determining brightness and resistance to thermal yellowing are known.

Paper substrates suitable for use herein may have any basis weight. It may have either a high or low basis weight, including basis weights of at least 10 lbs/3000 square foot, from 20 to 500 lbs/3000 square foot, or from 40 to 325 lbs/3000 square foot. The basis weight may be at least 10, 20, 30, 40, 50, 60, 70, 80, 90, 100, 125, 150, 175, 200, 225, 250, 275, 300, 325, 350, 375, 400, 425, 450, 475, and 500 lbs/3000 square feet, including any and all ranges and subranges therein.

The recording sheet may be suitably printed by generating images on a surface of the recording sheet using conventional printing processes and apparatus as for example laser, inkjet, offset and flexo printing processes and apparatus. In this method, the recording sheet is incorporated into a printing apparatus; and an image is formed on a surface of the sheet. The recording sheet may be printed with inkjet printing processes and apparatus such as, for example, desk top inkjet printing and high speed commercial inkjet printing. In one embodiment, an inkjet printing process is contemplated wherein an aqueous recording liquid is applied to the recording sheet in an image wise pattern. In another embodiment, an inkjet printing process is contemplated which includes (1) incorporating into an inkjet printing apparatus containing an aqueous ink the recording sheet, and (2) causing droplets of the ink to be ejected in an image wise pattern onto the recording sheet, thereby generating one or more images on the recording sheet. Inkjet printing processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530. In one embodiment, the inkjet printing apparatus employs a thermal inkjet process wherein the ink in the nozzles is selectively heated in an imagewise pattern, thereby causing droplets of the ink to be ejected onto the recording sheet in imagewise pattern. The recording sheet can also be used in any other printing or imaging process, such as printing with pen plotters, imaging with color laser printers or copiers, handwriting with ink pens, offset printing processes, or the like, provided that the toner or ink employed to form the image is compatible with the recording sheet. The determination of such compatibility is easily carried out given the teachings herein combined with the ordinary skill of one knowledgeable in the printing art.

The recording sheet may be printed if desired with any inkjet printer using pigmented inks. Pigmented inkjet inks are well known in the art, and typically contain a liquid vehicle, pigment colorants, and additional components including one or more dyes, humectants, detergents, polymers, buffers, preservatives, and other components. A pigment or any number of pigment blends may be provided in the inkjet ink formulation to impart color to the resulting ink. The pigment may be any number of desired pigments dispersed throughout the resulting inkjet ink. The pigmented inkjet inks may contain any suitable organic or inorganic pigment particles, including black pigments, white pigments, cyan pigments, magenta pigments, yellow pigments, and the like. Examples of suitable inorganic pigments are titanium oxide, cobalt blue (CoO—Al$_2$O$_3$), chrome yellow (PbCrO$_4$), and iron oxide. Suitable organic pigments include, for example, carbon black, azo pigments including diazo pigments and monoazo pigments, polycyclic pigments {e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates {e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 177, Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 1 17, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation and Sun Chemical Corporation.

Non-limiting examples of black pigments include carbon black, graphite, vitreous carbon, charcoal, and combinations thereof. Such carbon pigments are commercially available from such vendors as Cabot Corporation, Columbian Chemicals Company, Degussa AG, and E.I. DuPont de Nemours and Company. Suitable carbon black pigments include, but are not limited to, Cabot pigments such as MONARCH 1400, MONARCH 1300, MONARCH 1 100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates. Alternatively, almost any commercially available carbon pigment may be used, as long as it provides acceptable optical density and print characteristics.

Similarly, a wide variety of colored pigments may be suitably used, and can be blue, brown, cyan, green, white, violet, magenta, red, orange, yellow, and mixtures thereof. Non limiting examples of suitable color pigments are CABO-JET 250C, CABO-JET 260M, and CABO-JET 270Y (Cabot Corp.); PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140 (BASF Corp); CHROMOPHTAL Yellow 3G, CHROMOPHTAL Yellow GR, CHROMOPHTAL Yellow 8G, IGRAZIN Yellow SGT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B (Ciba-Geigy Corp.); DALAMAR Yellow YT-858-D and HEUCOPHTHAL Blue G XBT-583D (Heubach Group); Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow IOGX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series (Hoechst Specialty Chemicals); QUINDO Magenta, INDOFAST Brilliant Scarlet, QUINDO Red R6700, QUINDO Red R6713, and INDOFAST Violet (Mobay Corp.); L74-1357 Yellow, L75-1331 Yellow, and L75-2577 Yellow (Sun Chemical Corp.). Other examples of color pigments for inkjet inks are Normandy Magenta RD-2400, Permanent Violet VT2645, Argyle Green XP-11 1-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR2673, Lithol Fast Yellow 0991K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300 (available, variously, from known commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson).

The inkjet inks may contain one or more distinct type of pigment. In one embodiment, the mass average diameter of the pigment particles is about 10 nm to about 10 μm, and in another embodiment the average diameter is in the range of about 10 nm to about 500 nm, although sizes outside these ranges may also be used if the selected pigment can remain dispersed in the ink composition and the pigment particles provide adequate color properties. In one embodiment the pigment is present in an amount in the range of about 1% to about 20% by weight of the inkjet ink composition, and in another embodiment is present in an amount in the range of about 2% to about 6% by weight of the inkjet ink composition.

The pigment colorants may include one or more attached dispersant. Dispersants may help to improve dispersion stability, and may also serve to improve bleed control of the ink on the print media. Examples of suitable dispersant include, but are not limited to, a carboxylic acid, or a reactive group such as alcohol, amine, anhydride, sulfonic acid, thiol, halotriazine, maleimide, vinyl sulfone, or the like. A wide variety of dispersants for pigmented inkjet inks are known in the art. Such dispersants are broadly classed as polyalkyl glycols, polyalkyl imines, aryl dicarboxylic acids such as phthalic acids, isophthalic acids, terephthalic acids, carbohydrates, acrylates, methacrylates, trehalose, and isomers thereof. Generally, the glycol dispersants tend to be stable at neutral and higher pH, while imine dispersants tend to be stable at lower pH {e.g., about pH 4-6). In some applications, a polyethylene glycol dispersant is attached to the pigment particles in the ink. Examples of some suitable dispersants include, but are not limited to, polypropylene glycol, polyethylene imine, polyethylene glycol, trehalose, and combinations thereof. In some embodiments, the pigment also has a polymer coupled thereto, the polymer being additionally coupled to a dispersant, such that the pigment is polymer-dispersed.

The pigmented inkjet inks may additionally include any suitable vehicles or additives as are known in the art of preparing inkjet inks. Some of these include water, organic co-solvents, dye-based colorants, pH buffers, viscosity modifiers, antimicrobials, and surfactants.

The term, "about" when referring to a numerical value or range is intended to encompass the values resulting from experimental error that can occur when taking measurements.

All of the references, as well as their cited references, cited herein are hereby incorporated by reference with respect to relative portions related to the subject matter of the present invention and all of its embodiments.

EXAMPLES

The present invention may be described in further detail with reference to the following examples. The examples are intended to be illustrative, but the invention is not considered as being limited to the materials, conditions, or process parameters set forth in the examples.

The present inventors have found that the exemplary compositions in accordance with the several embodiments described herein are more compatible with papermaking chemicals such as anionic additives generally used at the size press. They have also found that the compositions quench OBAs less. They have also found that use of the compositions result in papers having a higher brightness than papers using $CaCl_2$ salts. They have also found that for exemplary and comparative compositions having equal molar amounts of the water soluble Ca(II) salts of the organic acid and $CaCl_2$, the exemplary compositions have at least the same print density when printed with common desktop inkjet printers, and especially with inkjet printers using pigmented inks.

FIG. 1 graphically shows the average values of black density using several exemplary, i.e., calcium acetate and calcium proprionate—containing sizing compositions compared to comparative compositions, i.e., $CaCl_2$, $MgSO_4$, and starch-only—compositions. In the figure, each set of vertical bars represents the average value of black densities observed for the various papers printed with the printers named on the x-axis. Within each set of vertical bars, the individual bars, when read left to right, correspond to the "Condition" shown in the legend when read from top to bottom. That is, within each set of vertical bars, the leftmost bar is for the exemplary "CaAcetate" composition, and the rightmost bar is the comparative "Starch" composition, and so on.

FIG. 2 shows black density data for exemplary and comparative compositions in tabular form.

FIG. 3 shows black density data for exemplary and comparative compositions in columnar form.

FIG. 4 shows the color gamut data obtained for exemplary and comparative compositions when printed with common desktop inkjet printers.

Figure 5:
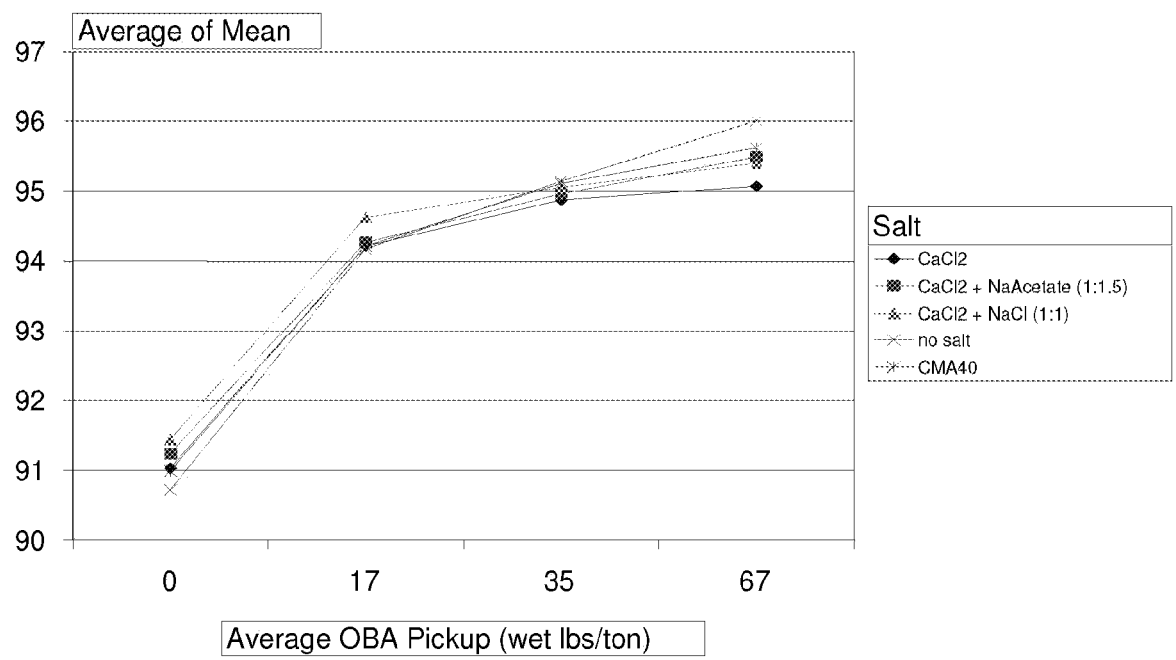
FIG. 5 shows average of mean ISO brightness (C) versus average optical brightening agent (OBA) pickup on papers sized with various salts.

FIG. 5 shows average of mean ISO brightness (C) versus average optical brightening agent (OBA) pickup on papers sized with various salts.

Figure 6:
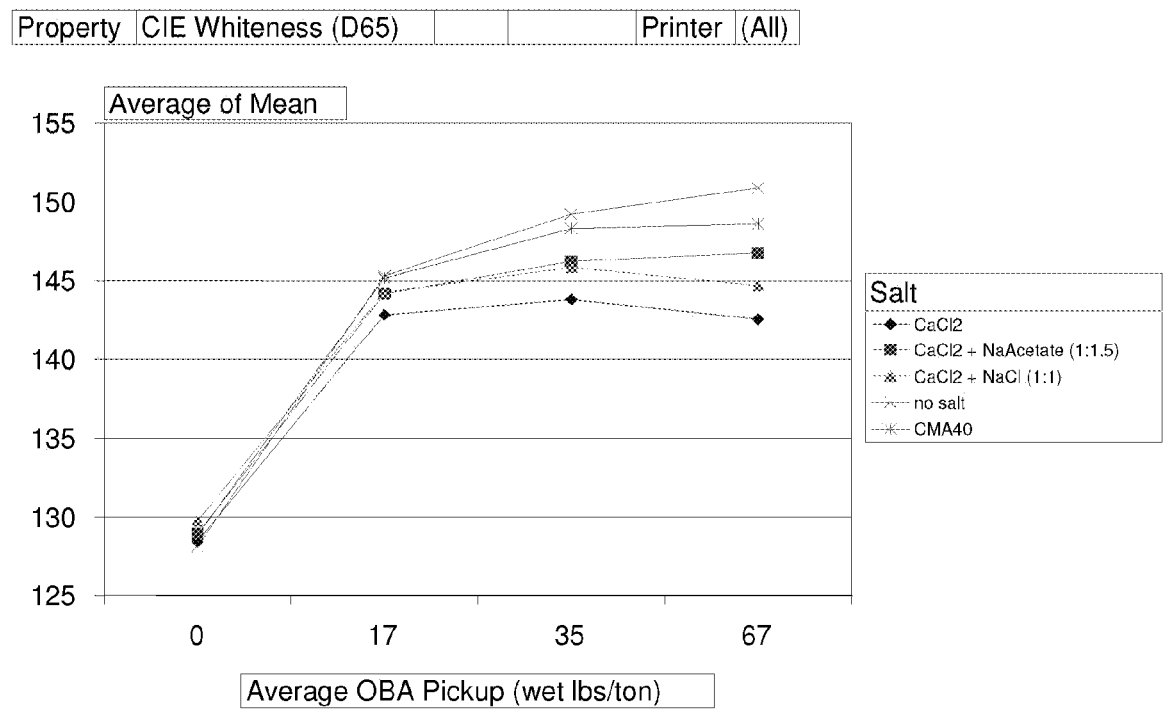
FIG. 6 shows average of means CIE whiteness (D65) versus average OBA pickup on papers sized with exemplary and comparative compositions.

FIG. 6 shows average of means CIE whiteness (D65) versus average OBA pickup on papers sized with exemplary and comparative compositions.

Figure 7:
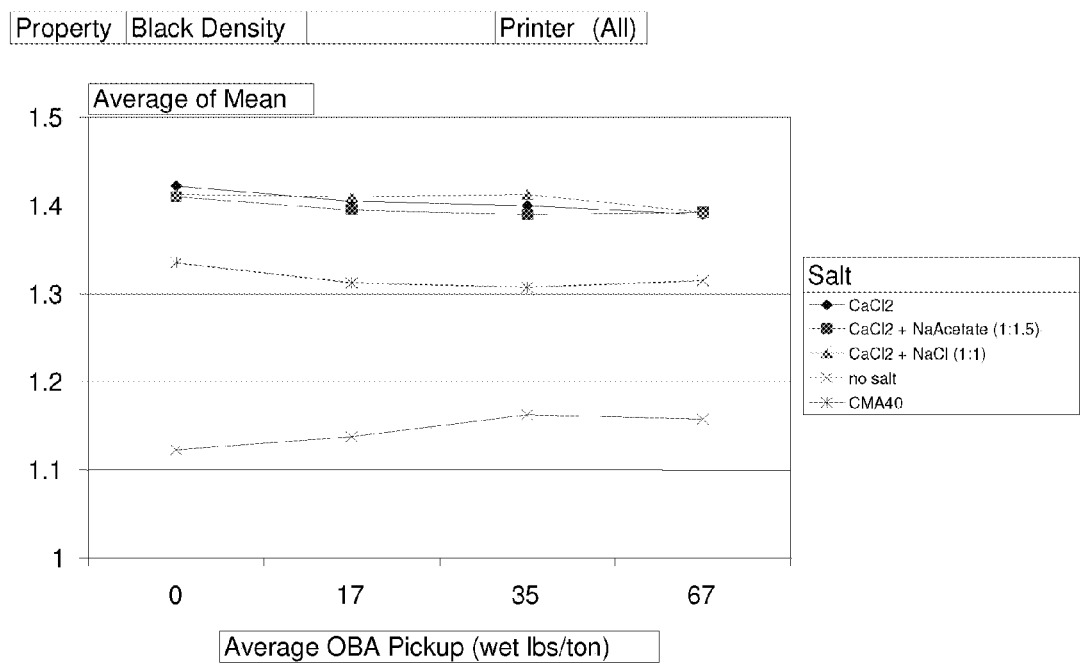
FIG. 7 shows average of mean black density versus average OBA pickup on papers sized with exemplary and comparative compositions.

FIG. 7 shows average of mean black density versus average OBA pickup on papers sized with exemplary and comparative compositions.

Figure 8:
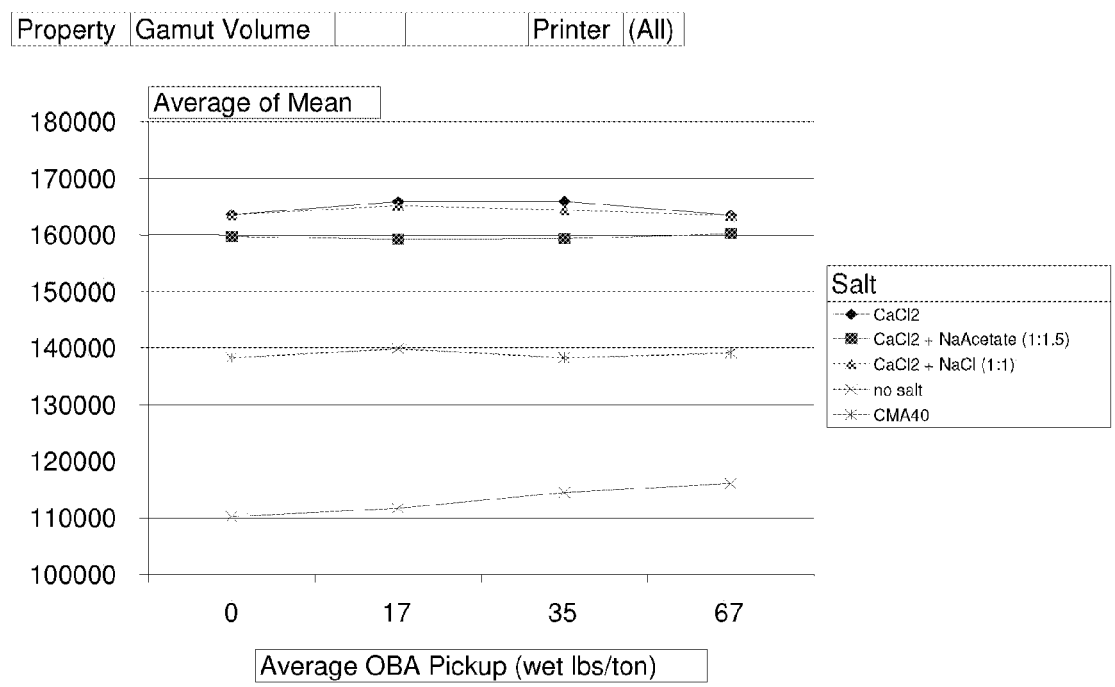
FIG. 8 shows average of mean gamut volume versus average OBA pickup on papers sized with exemplary and comparative compositions.

FIG. 8 shows average of mean gamut volume versus average OBA pickup on papers sized with exemplary and comparative compositions.

Figure 9:
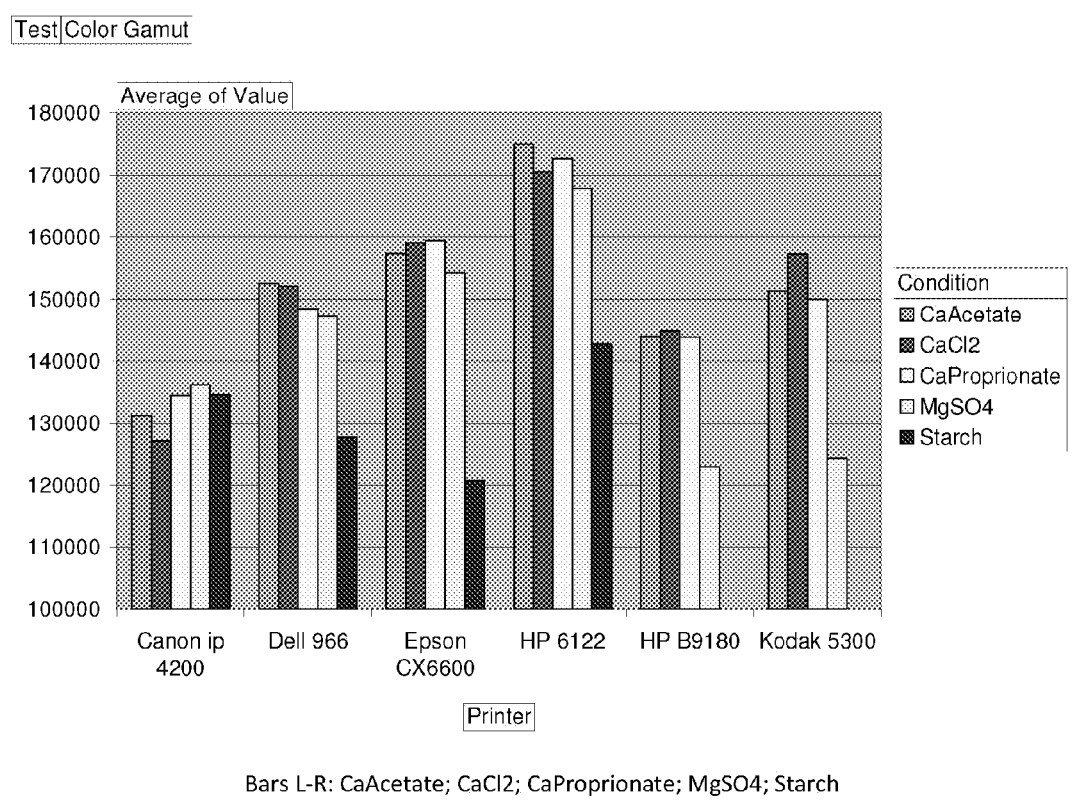
FIG. 9 shows average color gamut obtained with several printers using papers sized with exemplary and comparative compositions.

FIG. 9 shows average color gamut obtained with several printers using papers sized with exemplary and comparative compositions.

FIG. 10 shows OD and color gamut data obtained using an HP Officejet Pro 8000 printer with papers sized with various exemplary and comparative compositions.

FIG. 11 shows a summary of OD for papers sized with various exemplary and comparative compositions.

Figure 12:
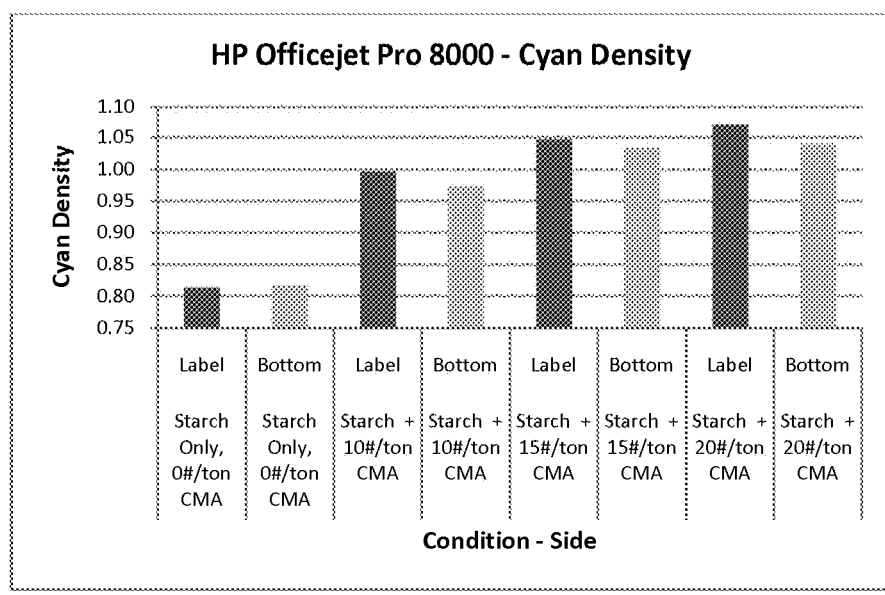
FIG. 12 shows cyan density obtained using HP Officejet Pro 8000 printer with papers sized with various exemplary and comparative compositions.

FIG. 12 shows cyan density obtained using HP Officejet Pro 8000 printer with papers sized with various exemplary and comparative compositions.

Figure 13:
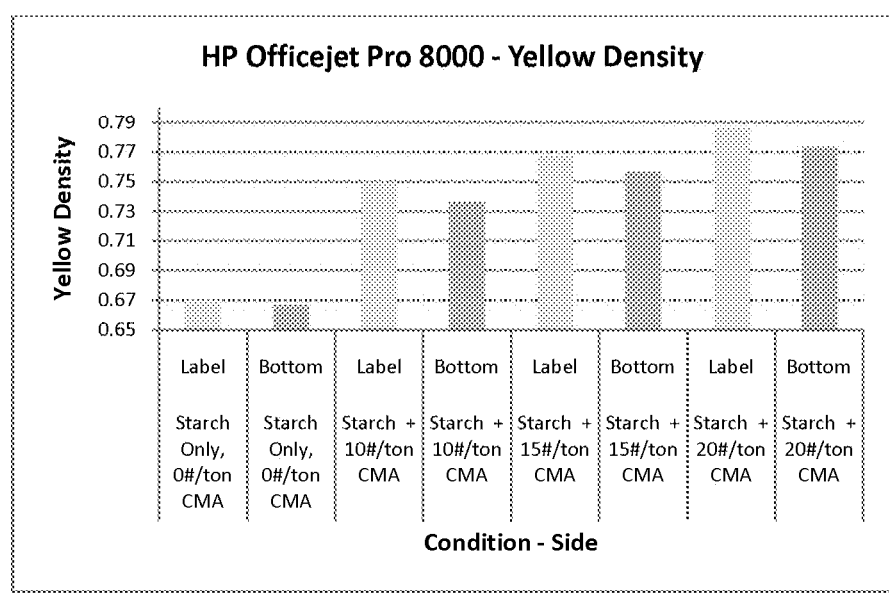
FIG. 13 shows yellow density obtained using HP Officejet Pro 8000 printer with papers sized with various exemplary and comparative compositions.

FIG. 13 shows yellow density obtained using HP Officejet Pro 8000 printer with papers sized with various exemplary and comparative compositions.

Figure 14:
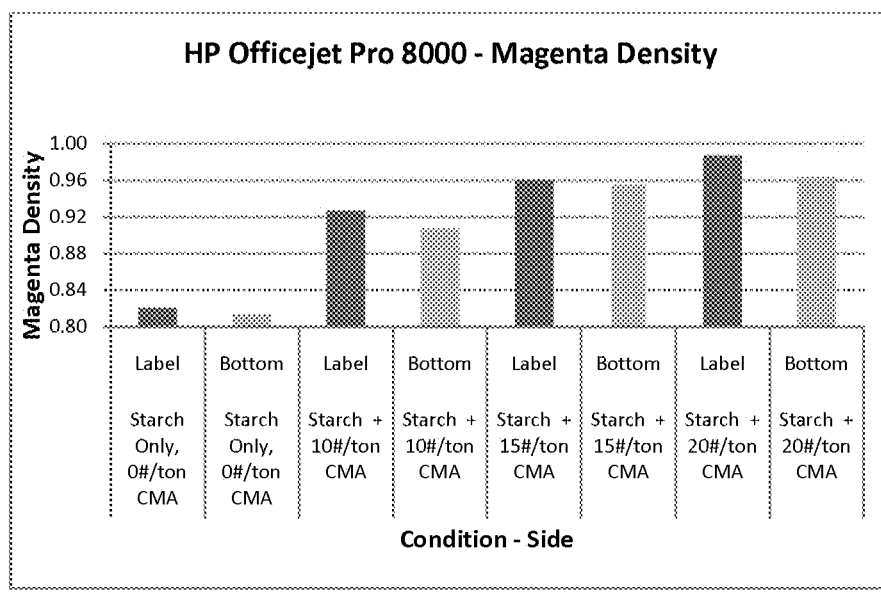
FIG. 14 shows magenta density obtained using HP Officejet Pro 8000 printer with papers sized with various exemplary and comparative compositions.

FIG. 14 shows magenta density obtained using HP Officejet Pro 8000 printer with papers sized with various exemplary and comparative compositions.

Figure 15:
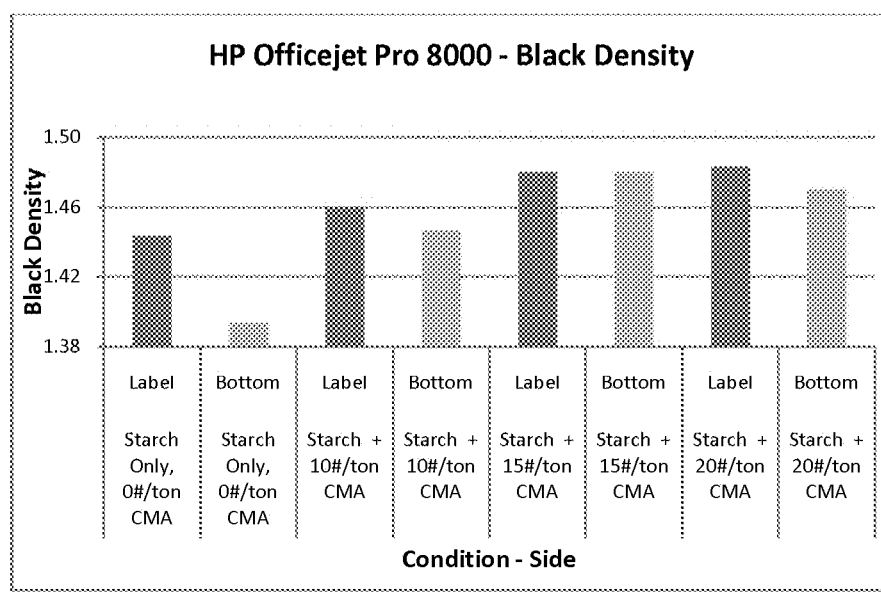
FIG. 15 shows black density obtained using HP Officejet Pro 8000 printer with papers sized with various exemplary and comparative compositions.

FIG. 15 shows black density obtained using HP Officejet Pro 8000 printer with papers sized with various exemplary and comparative compositions.

Figure 16:
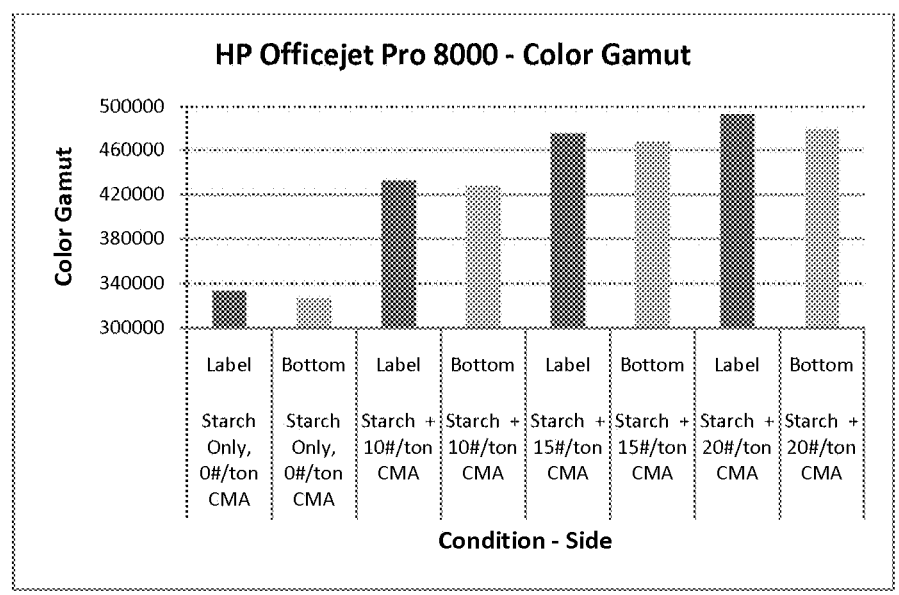
FIG. 16 shows color gamut obtained using HP Officejet Pro 8000 printer with papers sized with various exemplary and comparative compositions.

FIG. 16 shows color gamut obtained using HP Officejet Pro 8000 printer with papers sized with various exemplary and comparative compositions.

FIG. 17 shows black OD using drawdown with metal rod and ink and papers sized with various exemplary and comparative compositions.

Figure 18:
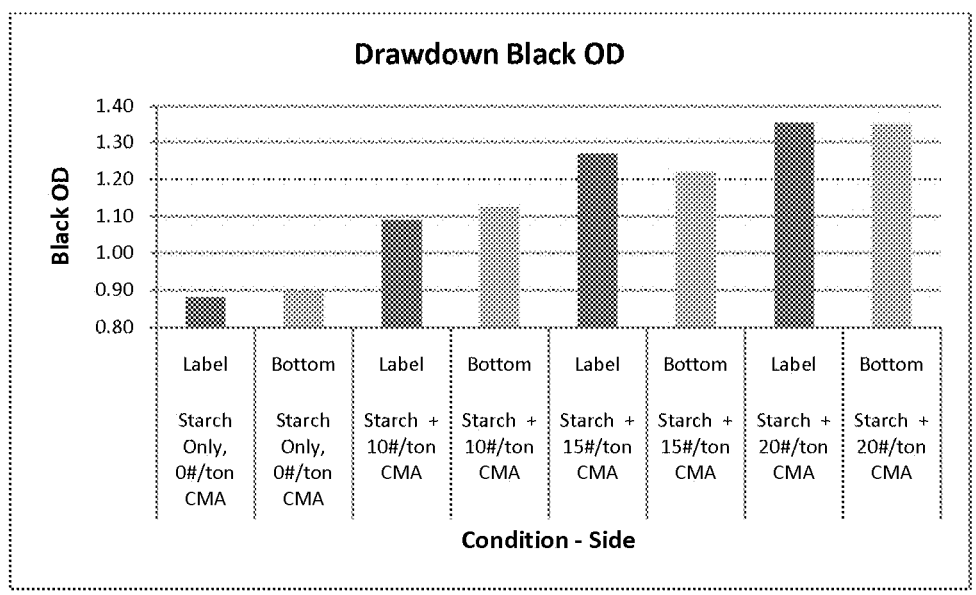
FIG. 18 graphically shows drawdown black OD with papers sized with various exemplary and comparative compositions.

FIG. 18 graphically shows drawdown black OD with papers sized with various exemplary and comparative compositions.

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

What is claimed is:

1. A paper, sizing composition, comprising:
a water-soluble salt of Ca(II) and at least one organic acid; and
starch,
wherein the salt is not calcium acetate calcium formate or calcium stearate.

2. The composition of claim 1, wherein said salt is present in an amount ranging from 0.1 to 50% by weight of the sizing composition.

3. The composition of claim 1, wherein the salt has a water solubility of greater than 0.002 grams salt/100 cc of water, at 25° C.

4. The composition of claim 1, wherein the organic acid has the formula RCOOH, wherein R is a hydrocarbon having 2-16 or 18-30 carbon atoms.

5. The composition of claim 1, wherein the organic acid is zwitterionic or amphoteric.

6. The composition of claim 1, wherein the salt is a salt having two identical organic acids.

7. The composition of claim 1, wherein the salt is a complex salt having two or more different organic acids.

8. The composition of claim 1, wherein the salt is calcium propionate, calcium lactate, calcium tartrate, calcium gluconate, calcium citrate, calcium lactate gluconate, calcium 2-ethylbutanoate, calcium EDTA, calcium DTPA, or a mixture thereof.

9. The composition of claim 1, wherein the salt is calcium propionate, calcium lactate, calcium tartrate, calcium gluconate, calcium citrate, calcium lactate gluconate, calcium 2-ethylbutanoate, or a mixture thereof.

10. The composition of claim 1, wherein the starch is present in an amount ranging from 0.1 to 75% by weight of the sizing composition.

11. The composition of claim 1, which further comprises an optical brightening agent.

12. A method for making the composition of claim 1, comprising contacting
a water-soluble salt of Ca(II) and at least one organic acid; and
starch;
to produce the composition of claim 1.

13. A recording sheet, comprising:
a paper substrate, comprising:
a plurality of cellulosic fibers; and
a paper sizing composition, comprising:
a water-soluble salt of Ca(II) and at least one organic acid; and
starch;
wherein the salt is not calcium acetate calcium formate or calcium stearate.

14. The recording sheet of claim 13, wherein the water soluble Ca(II) salt of the organic acid is present in an amount ranging, from about 2 to about 100 lbs Ca(II) salt/ton of paper.

15. The recording sheet of claim 13, wherein the water soluble Ca(II) salt is present in an amount ranging from about 0.02 g/m$^2$ to about 4 g/m$^2$.

16. The recording sheet of claim 13, wherein the starch is present in an amount ranging from about 5 to about 300 lbs/ton.

17. The recording sheet of claim 13, wherein the dry pickup of the sizing composition ranges from 0.25 to 8 gsm.

18. The recording sheet of claim 13, wherein the sizing composition is an internal sizing.

19. The recording sheet of claim 13, wherein the sizing composition is an external sizing.

20. The recording sheet of claim 13, wherein the sizing composition is an internal and an external sizing.

21. The recording sheet of claim 13, comprising a printed image thereon.

22. A method for making a recording sheet, comprising:
contacting:
a paper substrate comprising a plurality of cellulosic fibers; and
a composition, comprising:
a water-soluble salt of Ca(II) and at least one organic acid; and
starch;
to produce a recording sheet;
wherein the salt is not calcium acetate calcium formate or calcium stearate.

23. A method, comprising forming an image with a printing apparatus on a surface of a recording sheet, said recording sheet comprising:
a paper substrate comprising:
a plurality of cellulosic fibers; and
a composition, comprising:
a water-soluble salt of Ca(II) and at least one organic acid; and
starch;
wherein the salt is not calcium acetate calcium formate or calcium stearate.

24. The recording sheet of claim 13, wherein the salt is calcium propionate, calcium lactate, calcium tartrate, calcium gluconate, calcium citrate, calcium lactate gluconate, calcium 2-ethylbutanoate, calcium EDTA, calcium DTPA, or a mixture thereof.

25. The recording sheet of claim 13, wherein the salt is calcium propionate, calcium lactate, calcium tartrate, calcium gluconate, calcium citrate, calcium lactate gluconate, calcium 2-ethylbutanoate, or a mixture thereof.

26. The method of claim 22, wherein the salt is calcium propionate, calcium lactate, calcium tartrate, calcium gluconate, calcium citrate, calcium lactate gluconate, calcium 2-ethylbutanoate, calcium EDTA, calcium DTPA, or a mixture, thereof.

27. The method of claim 22, wherein the salt is calcium propionate, calcium lactate, calcium tartrate, calcium gluconate, calcium citrate, calcium lactate gluconate, calcium 2-ethylbutanoate, or a mixture thereof.

28. The method of claim 23, wherein the salt is calcium propionate, calcium lactate, calcium tartrate, calcium gluconate, calcium citrate, calcium lactate gluconate, calcium 2-ethylbutanoate, calcium EDTA, calcium DTPA, or a mixture thereof.

29. The method of claim 23, wherein the salt is calcium propionate, calcium lactate, calcium tartrate, calcium gluconate, calcium citrate, calcium lactate gluconate, calcium 2-ethylbutanoate, or a mixture thereof.

30. The composition of claim 1, wherein said salt is present in an amount ranging from 0.1 to 45% by weight of the sizing composition.

31. The composition of claim 1, wherein the organic acid has more than one carboxylic acid group.

32. The composition of claim 4, wherein one or more of the carbons in the hydrocarbon R group is substituted with one or more N, S, O, or P.

33. The composition of claim 4, wherein the hydrocarbon R group is a saturated, monounsaturated, or polyunsaturated C2-C5 alkyl, C1-C5 hydroxyalkyl, or phenyl group.

* * * * *